United States Patent
Roberts et al.

(10) Patent No.: US 10,989,663 B2
(45) Date of Patent: *Apr. 27, 2021

(54) DEVICE FOR OPTICALLY EXCITING FLUORESCENCE

(71) Applicants: Cambridge Display Technology Limited, Godmanchester (GB); Sumitomo Chemical Company Limited, Tokyo (JP)

(72) Inventors: Matthew Roberts, Godmanchester (GB); May Wheeler, Godmanchester (GB)

(73) Assignees: Cambridge Display Technology Limited, Godmanchester (GB); Sumitomo Chemical Company Limited, Tokyo (JP)

(*) Notice: Subject to any disclaimer, the term of this patent is extended or adjusted under 35 U.S.C. 154(b) by 80 days.

This patent is subject to a terminal disclaimer.

(21) Appl. No.: 16/302,480

(22) PCT Filed: May 17, 2017

(86) PCT No.: PCT/EP2017/061839
§ 371 (c)(1),
(2) Date: Nov. 16, 2018

(87) PCT Pub. No.: WO2017/198709
PCT Pub. Date: Nov. 23, 2017

(65) Prior Publication Data
US 2019/0162664 A1 May 30, 2019

(30) Foreign Application Priority Data
May 17, 2016 (GB) .................................. 1608681

(51) Int. Cl.
*G01N 21/64* (2006.01)
*B01L 3/00* (2006.01)

(52) U.S. Cl.
CPC ...... *G01N 21/648* (2013.01); *B01L 3/502707* (2013.01); *B01L 3/502715* (2013.01); *G01N 2201/0628* (2013.01)

(58) Field of Classification Search
CPC .. G01N 21/64; G01N 21/648; G01N 21/6428; G01N 21/6445;
(Continued)

(56) References Cited

U.S. PATENT DOCUMENTS

| 5,344,784 | A | * | 9/1994 | Attridge | G01N 21/6428 385/12 |
|---|---|---|---|---|---|
| 2009/0316429 | A1 | * | 12/2009 | Ramuz | G01N 21/7703 362/558 |
| 2010/0009458 | A1 | | 1/2010 | Ohtsuka | |
| 2012/0276549 | A1 | | 11/2012 | Cunningham et al. | |
| 2019/0293561 | A1 | * | 9/2019 | Roberts | G01N 21/648 |

FOREIGN PATENT DOCUMENTS

| EP | 2 138 882 A2 | 12/2009 |
|---|---|---|
| EP | 2 767 822 A1 | 8/2014 |

(Continued)

OTHER PUBLICATIONS

GB1608681.1, Oct. 6, 2016, Combined Search and Examination Report.
(Continued)

*Primary Examiner* — Jurie Yun
(74) *Attorney, Agent, or Firm* — Wolf, Greenfield & Sacks, P.C.

(57) ABSTRACT

A device for optically exciting fluorescence is disclosed. The device comprises transparent substrate having first and second opposite faces and a multilayer stack disposed on the second face of the substrate. The multilayer stack comprises a first layer having first and second opposite faces and a first refractive index and a second layer having first and second opposite faces and a second refractive index. The first face of the first layer is disposed on the second face of the (Continued)

substrate. The first face of the second layer is disposed on the second face of the first layer such that the first layer is interposed between the second layer and the substrate. The substrate has a third refractive index. The first refractive index is less than the second refractive index and the third refractive index. The device comprises a light source carried by the first face of the substrate and arranged to emit light towards the first face of the first layer.

17 Claims, 17 Drawing Sheets

(58) Field of Classification Search
CPC .............. G01N 2201/0628; B01L 3/00; B01L 3/502715; B01L 3/502707
USPC .......................................... 250/458.1, 459.1
See application file for complete search history.

(56) References Cited

FOREIGN PATENT DOCUMENTS

| WO | WO 90/06503 A2 | 6/1990 |
| WO | WO 97/39144 A1 | 10/1997 |
| WO | WO 2007/054710 A2 | 5/2007 |
| WO | WO 2010/009543 A1 | 1/2010 |
| WO | WO 2014/207089 A1 | 12/2014 |

OTHER PUBLICATIONS

PCT/EP2017/061839, Aug. 9, 2017, International Search Report and Written Opinion.
Combined Search and Examination Report for British Application No. GB1608681.1, dated Oct. 6, 2016.
International Search Report and Written Opinion for International Application No. PCT/EP2017/061839, dated Aug. 9, 2017.

* cited by examiner

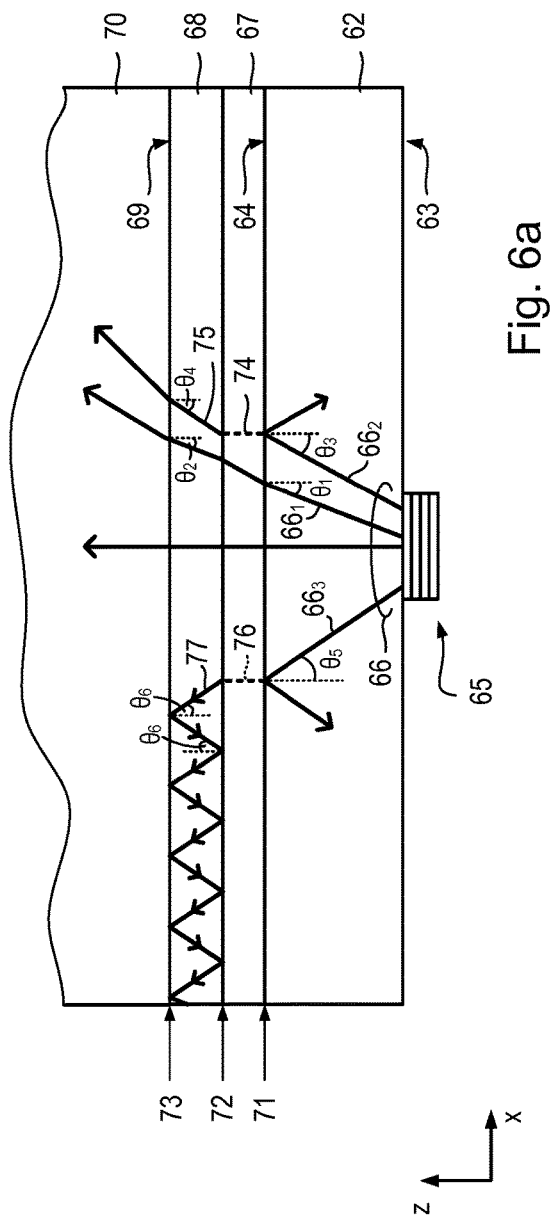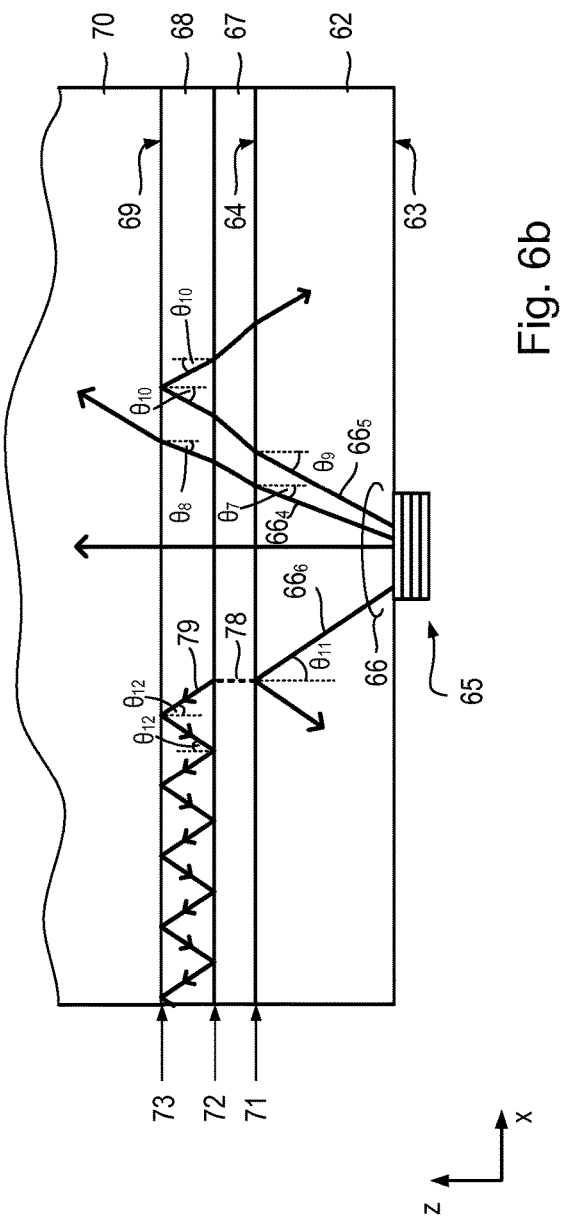

DEVICE FOR OPTICALLY EXCITING FLUORESCENCE

RELATED APPLICATIONS

This Application is a national stage filing under 35 U.S.C. 371 of International Patent Application No. PCT/EP2017/061839, filed May 17, 2017, which claims priority to United Kingdom patent application no. GB 1608681.1, filed May 17, 2016, each of which is incorporated herein by reference in its entirety.

FIELD OF THE INVENTION

The present invention relates to a device for optically exciting fluorescence.

BACKGROUND

Fluorescence sensing is increasingly being used in wide variety of applications including environmental monitoring and clinical diagnostics.

Fluorescence sensing is particularly useful in biological applications in which it is generally desirable to inspect a sample without destroying or damaging it. Although proteins, antibodies, DNA molecules and other forms of biological substances are generally not naturally fluorescent, fluorescence sensing can still be used. For example, a sample may be labelled with a fluorescent molecule, such as a fluorophore.

It is desirable to maximise absorption of excitation light by a fluorescent substance. This can help not only increase the number of photons emitted by the fluorescent substance, but also decrease the amount of unabsorbed excitation light thereby increasing the signal-to-noise ratio.

One way of helping to increase absorption of excitation light is to employ a waveguide. An optical mode guided within a waveguide may generate an evanescent field within a sensing layer in proximity to the waveguide. An overlap of the evanescent field with a fluorescent probe disposed within the sensing layer or on the surface of the waveguide may cause excitation of the fluorescent probe, followed by emission of a photon.

Examples of waveguide-based fluorescence sensors are described in US 2006/0147147 A1 and in R. Badugu et al.: "Fluorescence Spectroscopy with Metal-Dielectric Waveguides", Journal of Physical Chemistry C, volume 119, pages 16245 to 16255 (2015) which describes a metal-dielectric waveguide structure which includes a thin metal film coated with a dielectric layer.

Such devices tend to use external coherent light sources to provide light under tightly-controlled conditions, such as at a specific angle of incidence. Moreover, if more than one type of fluorophore is employed, each having a different excitation wavelength, then multiple light sources may be required, each requiring precise alignment.

SUMMARY

According to a first aspect of the present invention there is provided a device for optically exciting fluorescence. The device comprises a transparent substrate having first and second opposite faces and a multilayer stack disposed on the second face of the substrate. The multilayer stack comprises a first layer having first and second opposite faces and a first refractive index and a second layer having first and second opposite faces and a second refractive index. The first face of the first layer is disposed on the second face of the substrate and the first face of the second layer is disposed on the second face of the first layer such that the first layer is interposed between the second layer and the substrate. The substrate has a third refractive index and the first refractive index is less than the second refractive index and the third refractive index. A light source is carried by the first face of the substrate and arranged to emit light towards the first face of the first layer.

Thus, light emitted by a light source can be coupled into a waveguide mode without the need for precise alignment of the light source. The light source is integrated into the device and so the device can be compact.

The substrate may flexible. The substrate may comprise a plastics material.

The light source may be disposed on the substrate. Alternatively, the substrate may comprise a first substrate and the light source may be disposed on a second substrate, and the second substrate may be bonded to the first substrate.

The light source may comprise a layer structure which includes a light-emitting layer. The light-emitting layer may comprise a layer of organic material. The organic material may comprise a polymer.

The light source may have a light emitting area which is rectangular.

The light source may be configured so as to emit light anisotropically into the substrate. The light source may be configured such that the intensity of light emitted within an angular range centred at a first angle between a central axis or plane which is perpendicular to an interface between the substrate and light source is different to the intensity of light emitted within the same angular range centred at a second, different angle between the central axis or plane and light source.

The device may comprise at least two light sources. The device may comprise an array of light sources.

The second refractive index may be equal to or greater than the third refractive index.

The first layer may comprise a dielectric material. The first layer may comprise a metal. If the first layer comprises a metal, the refractive index of the first layer consists of the real part of the complex refractive index of the first layer.

The second layer may have a thickness such that a single mode is supported, for example, the $TE_0$ mode. The single mode may be a waveguide mode. The single mode may be a surface plasmon mode supported at an interface between the first layer and the second layer. The single mode may be a fundamental surface plasmon mode.

The second layer may have a thickness such that at least two modes are supported. The at least two modes may comprise at least one waveguide mode and at least one surface plasmon mode. The at least two modes may comprise at least two waveguide modes, for example, the $TE_0$ mode and the $TM_0$ mode. The at least two modes may comprise at least two surface plasmon modes, for example, a fundamental mode and a higher-order mode.

The second layer may comprise a dielectric material.

The light emitted from the light source may comprise a first portion emitted within an angular range about a central axis or plane, and second portion emitted outside the angular range. The device may further comprise a light stop arranged to block the first portion of the light. The device may comprise a further light stop arranged to block a sub-range of the second portion of light.

The light stop/s may be embedded in the substrate. The light stop/s may be disposed between the substrate and the first layer.

The device may comprise at least one region of fluorescent material carried by the second face of the second layer. The device may comprise a layer of receptors for binding to a specific analyte carried by the second face. The receptors may comprise a fluorescent material.

At least a portion of the multilayer stack may be disposed in a ridge.

The second face of the second layer may have a patterned surface including at least one feature. The patterned surface may comprise a periodic feature. The patterned surface may comprise at least one ridge. The patterned surface may comprise at least one step.

The feature may have a lateral characteristic dimension, for example, the width of a step or the period of a grating, of between 1 m and 10 mm.

The feature may have a vertical characteristic dimension, for example, the height of a step or ridge, of between 1 nm and 300 nm.

The device may comprise a circuit carried by the substrate which is in communication with the light source. The circuit may include a monolithic integrated circuit. The circuit may include a circuit portion comprising solution-processable transistors.

According to a second aspect of the present invention there is provided apparatus comprising a device according to a first aspect of the present invention and a detector directed at the second face of the second layer, the multilayer stack being interposed between the substrate and the detector.

The detector may comprise a layer of light-sensitive organic material. The detector may comprise an annular light-sensitive region which is concentric with an optical axis or a parallel pair of light-sensitive regions having a mid-line which is collinear with an optical plane.

According to a third aspect of the present invention there is provided a lab-on-a-chip device comprising a device according to the first aspect of the present invention or apparatus according to the second aspect of the present invention, and a fluidic circuit including a port for providing a sample in fluid communication with a channel, wherein at least a portion of the channel is arranged so as to present the sample to the second face of the second layer or to a region over the second face of the second layer.

The lab-on-a-chip device may comprise control apparatus configured to cause the light source to emit light and to process a signal received from the detector.

The lab-on-a-chip device may be portable. The lab-on-a-chip device may be adapted to be hand-holdable. The lab-on-a-chip device may be adapted to be implantable, for example, in vivo.

According to a fourth aspect of the present invention, there is provided a method of operating apparatus according to the second aspect of the presentation or a lab-on-a-chip device according to the third aspect of the present invention, the method comprising causing a sample to be presented to the second face of the second layer, and causing the light source to emit light.

The method may further comprise receiving an input signal from the detector, processing the input signal to identify a characteristic feature of the input signal and, in response to identifying the characteristic feature of the input signal, outputting an indictor signal.

The method may further comprise receiving the input signal or a series of input signals from the detector over a given period and processing the input signal or series of input signals so as to identify time-dependent changes in the input signal or series of input signals.

BRIEF DESCRIPTION OF THE DRAWINGS

Certain embodiments of the present invention will now be described, by way of example, with reference to the accompanying drawings, in which:

FIGS. 6a and 6b illustrate propagation of light through a multilayer structure having first and second refractive index relationships;

DETAILED DESCRIPTION OF CERTAIN EMBODIMENTS

Figure 1:
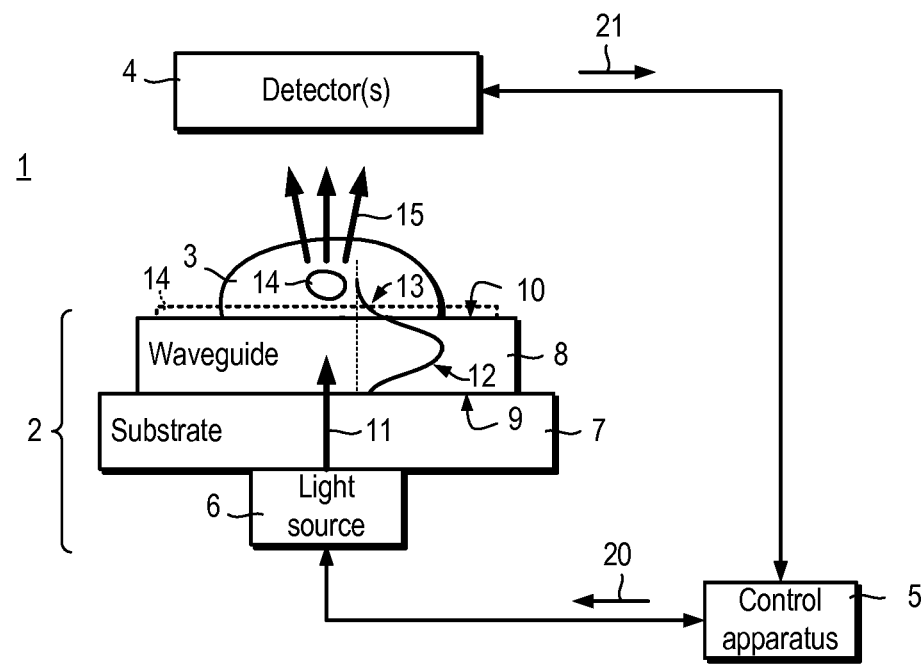
FIG. 1 illustrates a waveguide-based fluorescence sensing apparatus.

In the following, like parts are denoted by like reference numerals.

Referring to FIG. 1, a waveguide-based fluorescence sensing apparatus 1 (herein also referred to as a "waveguide-based fluorescence sensing system" or simply a "sensing system") is shown. The sensing system 1 includes a device 2 for optically exciting fluorescence so as to probe a sample 3, at least one device 4 for sensing or detecting fluorescence (herein referred to simply as a "detector") and a control apparatus 5.

The fluorescence-exciting device 2 (herein also referred to as an "optical platform") includes a light source 6, in the form of an organic light-emitting diode, a transparent substrate 7 and a waveguide 8 having first and second surfaces 9, 10. The light source 6 is attached to the substrate 7 and is arranged to emit excitation light 11 (or "excitation radiation") at a predetermined wavelength, $\lambda_{exc}$, which passes through the substrate 7 and into the waveguide 8. The excitation light 11 is incident at the first surface 9 of the waveguide 8 and may couple into a guided mode 12 of the waveguide 8. The guided mode 12 generates an evanescent field 13 which extends from the second surface 10 and into a sample 3 which is placed on or near to (for example, within 300 nm) the second surface 10 of the waveguide 8.

The sample 3 contains, is in direct contact with or is proximate to at least one region 14 of a fluorescent material (or "fluorophore") having a characteristic absorption wavelength, $\lambda_{ab}$, and emission wavelength, $\lambda_{em}$. A fluorescent region 14 may take the form of, among other things, a molecule, particle or layer (or "film"). If the evanescent field 13 overlaps with the fluorescent region 14, the fluorescent region 14 absorbs the excitation light 11 and re-emits fluorescence emission 15.

As will be explained in more detail later, the fluorescent region 14 may form part of the fluorescence-exciting device 2. In particular, the fluorescent region 14 may be provided on the second surface 10 of the waveguide 8.

The sample 3 may be a liquid, a solid or a gas, or a mixture, such as a suspension, gel or aerosol. As will be explained in more detail later, the sample 3 may be taken from a biological system, such as animal or plant, chemical system or other form of system such as an environmental system. The sample 3 may be unprocessed, for example fresh whole blood or water sample taken from a river or reservoir, or processed, for example, filtered fresh whole blood or filtered water. The fluorescent material may take the form of an organic material, such as a protein, DNA or other organic molecule, or an inorganic material, such as an inorganic semiconductor.

The (or each) detector 4 may take the form of a photodiode and is disposed such that the sample 3 is interposed between the fluorescence-exciting device 2 and the detector 4 and is directed at the second surface 10 so as to collect fluorescence emission 15.

Figure 2:
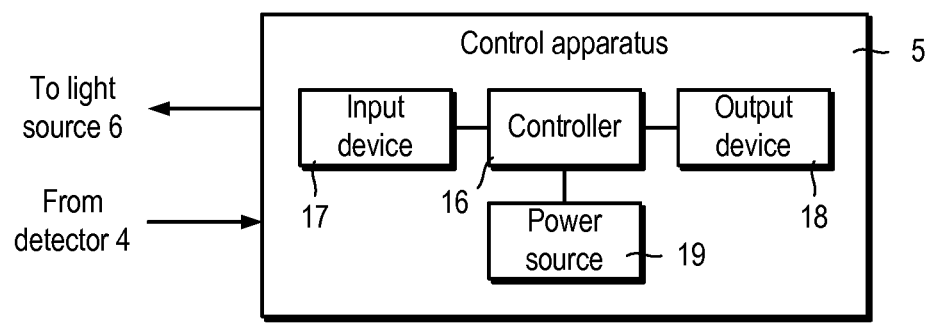
FIG. 2 is a schematic block diagram of a control apparatus.

Referring also to FIG. 2, the control apparatus 5 includes a controller 16, for example in the form of a microcontroller, a user input device 17 for allowing a user (not shown) to control a measurement (e.g. start the measurement), an output device 18 for signalling a result of the measurement and a power source 19. The power source 19 may include a power store (such as a battery) and/or energy-harvesting device (such as a photovoltaic cell) thereby allowing the system 1 to be used without the need to be connected to an external electrical source (such as mains power or communications bus). The microcontroller 16 may include or be provided with a network interface (not shown) which may be wired or wireless for allowing the system 1 to be remotely deployed, for example, from point of data collection and analysis. The controller 16 is configured to drive either directly or indirectly (in other words, via an external driver), the light source 6 with an input signal 20 and receive an output signal 21 from the detector 4 which may be pre-processed (for example amplified, filtered and/or integrated by a front-end circuit).

The sensing system 1 may be portable (for example, handheld) and/or be remotely-locatable (for example, in a process plant or in the field).

Figure 3:
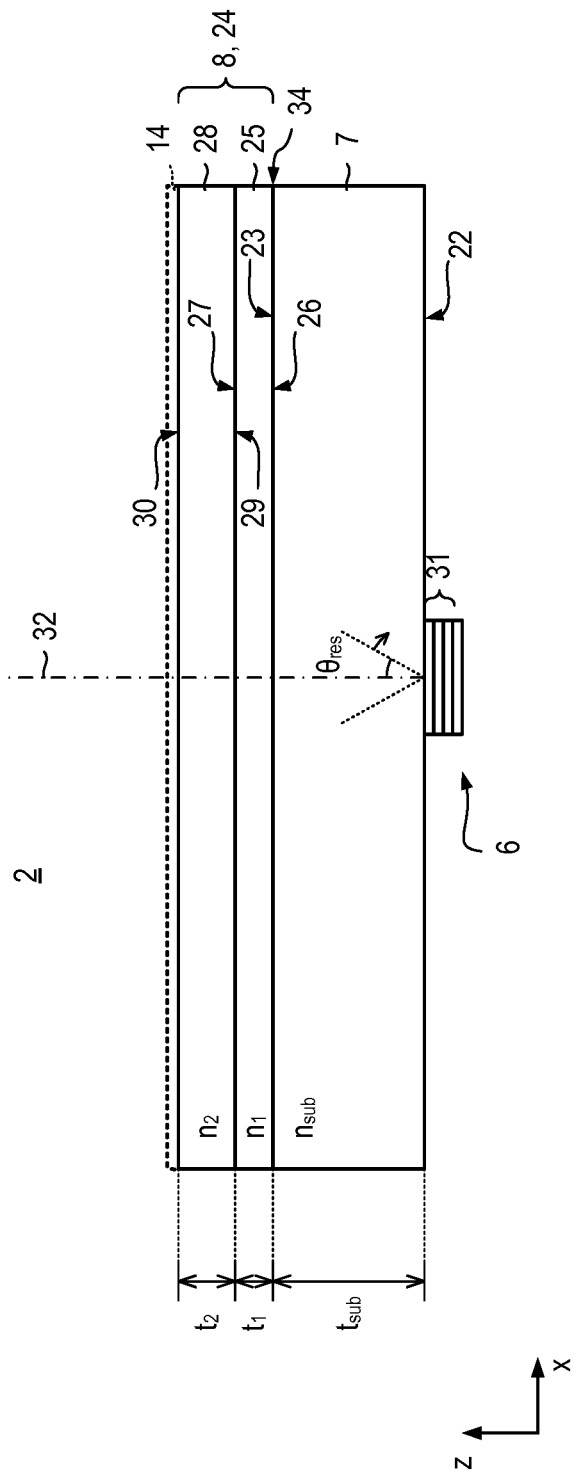
FIG. 3 is a cross-sectional view of a device for optically exciting fluorescence.

Referring to FIG. 3, the fluorescence-exciting device 2 is shown in more detail.

The substrate 7 is generally layer-like having first and second opposite faces 22, 23 and a refractive index, $n_s$. The substrate 7 comprises a substantially optically transparent material, such as polyethylene terephthalate (PET) or polyethylene naphthalate (PEN).

The substrate 7 is preferably flexible, for example, capable of being reversibly bent through an angle of 90° or more. The substrate 7 has a thickness, $t_{sub}$, which may be, for example, less 1 mm or less than 0.5 mm.

The waveguide 8 comprises a multilayer stack 24 (herein also referred to simply as the "stack") disposed directly on the second face 23 of the substrate 7. The multilayer stack 24 includes a first layer 25 having first and second opposite faces 26, 27 disposed directly on the second face 23 of the substrate 7 and a second layer 28 having first and second opposite surfaces 29, 30 disposed directly on the second face 27 of the first layer 25. The first face 26 of the first layer 25 and the second face 30 of the second layer provide the first and second surfaces 9, 10 (FIG. 1) respectively of the waveguide 8.

The multilayer stack 13 may include additional layers (not shown). The multilayer stack 24 preferably is free of (that is, does not include) a plasmon-creating structure, such as a layer of metal.

The first layer 25 has a refractive index $n_1$ which is less than the refractive index $n_s$ of the planar substrate 7, i.e. $n_1 < n_s$. The second layer 28 has a refractive index $n_2$ which is greater than the refractive index $n_1$ of the first layer 25, i.e. $n_2 > n_1$.

The first layer 25 may comprise a first substantially optically-transparent material, such as silicon dioxide ($SiO_2$), and may have a thickness, $t_1$, of, for example, between 50 and 500 nm. Alternatively, the first layer 25 may comprise a metal such as silver (Ag) or gold (Au) with a thickness $t_1$ of, for example, between 10 and 50 nm. When the first layer 25 comprises a metal, references to the refractive index of the first layer 25 should be considered to be referring to the real part of the complex refractive index of the metal.

The second layer 28 comprises a second substantially optically-transparent material, such as, for example, indium-tin-oxide (ITO) or titanium dioxide, and has a thickness, $t_2$, of, for example, between 50 and 500 nm.

The fluorescence-exciting device 2 may include a layer of fluorescent material 14 disposed on the second face 30 of the second layer 28.

The fluorescence-exciting device 2 is preferably flexible, for example, capable of being reversibly bent through an angle of 90° or more.

The light source 6 takes the form of a light-emitting layer structure 31 disposed on the first face 22 of the substrate 7.

The substrate 7 may comprise first and second substrates (not shown) which are optically connected (for example, using index-matching epoxy) with the light-emitting layer structure 31 supported on the first substrate (not shown) and the multilayer stack 24 disposed on the second substrate (not shown). Thus, the multilayer stack 13 and the light-emitting layer structure 31 may be fabricated separately and combined to form a unitary substrate 7.

The light-emitting layer structure 31 comprises an organic light-emitting diode (OLED) or polymer light-emitting diode (PLED). At least a portion of the light-emitting layer structure 31 is preferably fabricated using solution-processable materials. The light-emitting layer structure 31 may comprise a light-emitting diode chip bonded to the substrate 7.

The light-emitting layer structure 31 is able to emit excitation light 11 (FIG. 1) generally centred on an axis 32 (herein referred to as a "central axis" or "optical axis"). As will be explained in more detail later, excitation light 11 (FIG. 1) emitted at or beyond a critical angle $\theta_{crit}$ from the central axis 32 can be coupled into the guided mode 12 (FIG. 1).

Before describing propagation of light within the fluorescence-exciting device 2, propagation of light through different media will first be described.

Total Internal Reflection

Referring to FIGS. 4a to 4d and 5, light 41 which is incident at an interface between a first medium 42 having a first refractive index and a second medium 43 having a second refractive index experiences a change in propagation direction if the first and second refractive indices are not equal through a process of refraction. The angle which the light makes with the normal to the interface in the first medium is termed the angle of incidence. The angle made with the normal to the interface in the second medium is termed the angle of refraction.

Figure 4A:
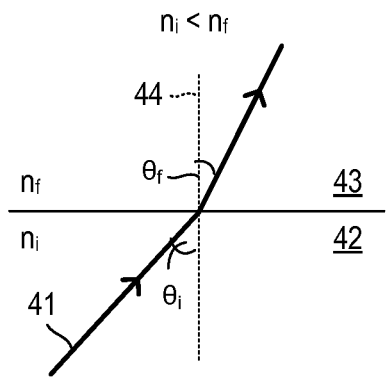
FIGS. 4a to 4d illustrate behaviour of light at an interface between two layers having different refractive indices at different angles of incidence.

FIG. 4a shows the propagation of a light ray 41 from a first medium 42 having refractive index $n_i$ into a second medium 43 having refractive index $n_f$. The angle of incidence is $\theta_i$ and the angle of refraction is $\theta_f$. The refractive indices and angles of incidence and refraction are related by Snell's Law, which states:

$$n_i \sin(\theta_i) = n_f \sin(\theta_f) \qquad (o)$$

In the arrangement shown in FIG. 4a, $n_i < n_f$. Thus, $\theta_f < \theta_i$ and the light ray 41 bends away from the normal 44 in the second medium 43.

Figure 4B:
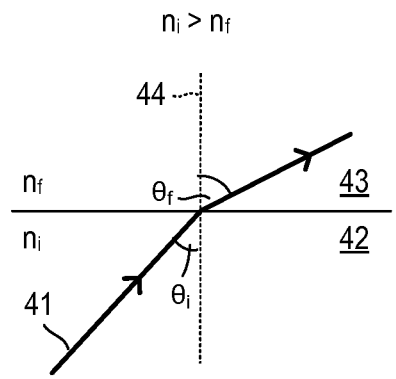

FIG. 4b shows the propagation of the light ray 41 when $n_i > n_f$. In this case, $\theta_f > \theta_i$ and the light ray 41 bends towards the normal 44 in the second medium 43.

Figure 4C:
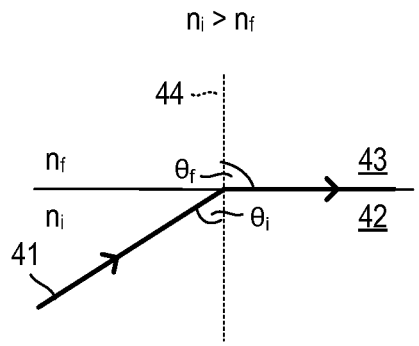

FIG. 4c shows the propagation of the light ray 41 when $n_i > n_f$ and the angle of incidence is equal to the critical angle, $\theta_c$. The critical angle is the angle of incidence such that the angle of refraction is equal to 90°.

Figure 4D:
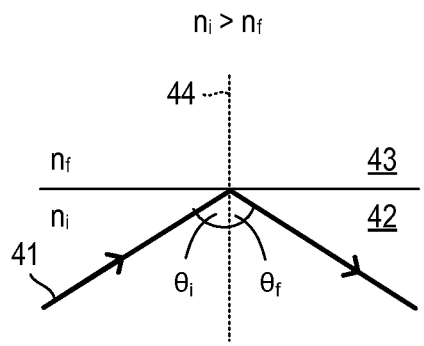

FIG. 4d shows the propagation of the light ray 41 when $n_i > n_f$ and the angle of incidence is greater than the critical angle. The light ray 41 is reflected at the interface and does not propagate within the second medium 43. This is called total internal reflection.

Although no travelling wave exists within the second medium 43, an evanescent wave (not shown) is generated. The evanescent wave (not shown) is a solution to the wave equation which satisfies the boundary conditions at the interface. The evanescent wave has an amplitude which decays exponentially in the direction normal to the interface.

Figure 5:
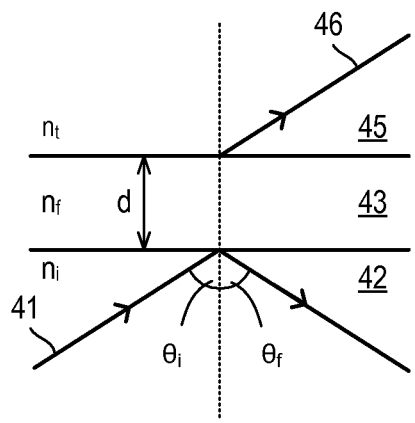
FIG. 5 illustrates evanescent tunneling of light through a low-index layer.

The evanescent wave (not shown) is not a travelling wave. However, if a third medium 45 is brought into close proximity with the second medium 43, the third medium 45 having a refractive index, $n_t$, which is greater than the refractive index, $n_2$, of the second medium 43, then the evanescent wave (not shown) may tunnel through the second medium 43 and a travelling wave 46 may resume in the third medium 45. This is called frustrated total internal reflection and is shown in FIG. 5. The spacing, d, between the first medium 42 and the third medium 43 is of the order of several wavelengths of the light.

Thus an evanescent wave in a first medium, located close to a boundary with a second medium having a greater refractive index than the first medium, can give rise to a travelling wave in the first medium.

The light emitted by a fluorescing particle comprises a combination of near-field emission and far-field emission. Far-field emission is radiative and consists of travelling wave(s). Near-field emission is non-radiative and consists of evanescent wave(s).

A fluorescing particle located in a first medium, close to a boundary with a second medium having a greater refractive index than the first medium, can emit near field evanescent waves which are subsequently coupled into the first medium as travelling waves in the first medium.

Polarisation

Light incident at a surface may be categorised as S-polarised or P-polarised.

A plane of incidence is defined by the vector along the propagation direction of the incident light and the vector perpendicular to the plane of the surface at which the light is incident. S-polarised light has its electric field component perpendicular to the plane of incidence. P-polarised light has its electric field component parallel to the plane of incidence.

Light propagation through multilayer structures will now be described. The discussion first addresses structures in which the first layer comprises a dielectric material, before describing propagation through structures in which the first layer comprises a metal.

Light Propagation Through Multilayer Structures: Dielectric First Layer

FIGS. 6a and 6b illustrate light propagation through first and second multilayer devices $61_1$, $61_2$ respectively. The first and second multilayer devices $61_1$, $61_2$ have similar structures to the fluorescence-exciting device 2 (FIG. 3) having different values of refractive indices.

Referring to FIG. 6a, the first multilayer structure $61_1$ comprises a transparent substrate 62 having first and second opposite faces 63, 64 and a substrate refractive index $n_s$. The substrate 62 supports a light-emitting layer structure 65 directly on the first face 63 of the substrate 62 which is arranged to emit light 66 into the substrate 62 at a range of angles. A first layer 67 having a first refractive index $n_1$ is disposed directly on the second face 64 of the substrate 62 and a second layer 68 having a second refractive index $n_2$ is disposed directly on the first layer 67 and has a free face 69. A medium 70 having a third refractive index $n_3$ is in direct contact with the free face 69 of the second layer 68. The substrate 62, the first layer 67, and the second layer 68 comprise dielectric materials.

The third refractive index $n_3$ is less than the second refractive index $n_2$ and the substrate refractive index, i.e. $n_3 < n_2, n_s$. In this example, the second refractive index $n_2$ is equal to the substrate refractive index $n_s$, i.e. $n_2 = n_s$. However, the second refractive index $n_2$ may be greater than the substrate refractive index $n_s$, i.e. $n_2 > n_s$. The first refractive index $n_1$ is smaller than the second refractive index $n_3$, i.e. $n_1 < n_2$.

First, second and third interfaces 71, 72, 73 are formed between the substrate 62 and the first layer 67, between the first layer 67 and the second layer 68 and between the second layer 68 and the medium 70.

A first light ray $66_1$ is incident at the first interface 71 at a first angle $\theta_1$ to the normal to interface 71. The first angle $\theta_1$ is smaller than the critical angle at the first interface 71. The first ray $66_1$ is refracted at the first interface 71 and bends away from the normal in the first layer 67. At the second interface 72 between the first layer 67 and the second layer 68, the ray $66_1$ is again refracted and bends towards the normal in the second layer 68. At the third interface 72 between the second layer 68 and the medium 70, a second angle of incidence $\theta_2$ of the first light ray $66_1$ is smaller than the critical angle at third interface 72. The first light ray $66_1$ is refracted and bends away from the normal. Thus, the first light ray $66_1$ propagates through the substrate 62 and the first and second layers 67, 68 and into the medium 70.

A second light ray $66_2$ is incident at the first interface 71 at a third angle $\theta_3$ to the normal to first interface 71. The third angle $\theta_3$ is greater than the critical angle at interface 71. The ray $66_2$ undergoes total internal reflection at the first interface 71. A first evanescent wave 74 is generated in the first layer 67. The thickness of the first layer 67 is such that the first evanescent wave 74 tunnels through the first layer 67 and a first travelling wave 75 resumes in the second layer 68.

The angle to the normal made by the first travelling wave 75 in the second layer 68 is equal to the angle which would be made if the first layer 67 were not present and the substrate 62 were in direct contact with the second layer 68. The second refractive index $n_2$ is equal to the substrate refractive index and so a fourth angle of incidence $\theta_4$ of the first travelling wave 75 at interface third interface 73 is equal to the third angle $\theta_3$.

The third angle $\theta_3$ is less than the critical angle at the third interface 73 and so the first travelling wave 75 does not undergo total internal reflection. The first travelling wave 75 refracts and bends away from the normal. Thus, second light ray $66_2$ propagates through the substrate 62 and the first and second layers 67, 68 and into the medium 70.

The second light $66_2$ follows this path when the third angle $\theta_3$ satisfies the inequality $(n_1/n_s)<\sin\theta_3<(n_3/n_s)$. This occurs when $n_1<n_3$, i.e. when the first refractive index $n_1$ is smaller than the third refractive index.

A third light ray $66_3$ is incident at the first interface 71 at a fifth angle $\theta_5$ to the normal to the first interface 71. The fifth angle $\theta_5$ is greater than the critical angle at the first interface 71. The third light ray $66_3$ undergoes total internal reflection at the first interface 71. A second evanescent wave 76 is generated in the first layer 67. The thickness of the first layer 67 is such that the second evanescent wave 76 tunnels through the first layer 67 and a second travelling wave 77 resumes in the second layer 68.

The angle to the normal made by the second travelling wave 77 in the second layer 68 is equal to the angle which would be made if the first layer 67 were not present and the substrate 62 were in direct contact with the second layer 68. The second refractive index $n_2$ is equal to the substrate refractive index $n_s$ and so a sixth angle of incidence $\theta_6$ of the travelling wave 77 at second interface 72 is equal to the fifth angle $\theta_5$.

When total internal reflection occurs at an interface, the angles of incidence and reflection are equal. Thus, all subsequent angles of incidence at second and third interfaces 72, 73 are equal to the sixth angle of incidence $\theta_6$.

For the second travelling wave 77, the sixth angle $\theta_6$ is greater than the critical angle at third interface 73 and the second travelling wave 77 undergoes total internal reflection. Since the first refractive index $n_1$ is less than the third refractive index $n_3$, the critical angle at interface second interface 72 is smaller than the critical angle at third interface 73. Therefore, the second travelling wave 77 is subsequently reflected at second interface 72. Since all subsequent angles of incidence at the second and third interfaces 72, 73 are equal to the sixth angle $\theta_6$ which is greater than the critical angles at the second and third interfaces 72, 73, the second travelling wave 77 is guided by multiple total internal reflections within the second layer 68.

The guided mode 77 is shown for only one angle of incidence, namely the fifth angle of incidence $\theta_5$. It will be appreciated, however, that other angles of incidence which excite guided modes within the second layer 68 will have points of total internal reflection at different locations on the second face 69.

Referring to FIG. 6b, the second multilayer structure $61_2$ is shown. The second multilayer structure $61_2$ is the same as the first multilayer structure $61_2$ (FIG. 1) except that the third refractive index $n_3$ is less than the first refractive index $n_1$, i.e. $n_3<n_1$.

A fourth light ray $66_4$ with a seventh angle of incidence $\theta_7$ at the first interface 71 smaller than the critical angle at the second interface 71 does not undergo total internal reflection at the second interface 71. An eighth angle of incidence $\theta_8$ of the fourth light ray $66_4$ at the second interface 72 is smaller than the critical angle at the second interface 72. Thus, the fourth light ray $66_4$ propagates through the substrate 62 and the first and second layers 67, 68 and into the medium 70.

A fifth light ray $66_5$ having a ninth angle of incidence $\theta_9$ at the first interface 71' which is smaller than the critical angle at the first interface 71' does not undergo total internal reflection at the first interface 71'. A tenth angle of incidence $\theta_{10}$ of fifth light ray $66_5$ at the third interface 73' is greater than the critical angle at the third interface 73' and, thus, the fifth light ray $66_5$ is reflected at the third interface 73'.

For the fifth light ray $66_5$, the tenth angle $\theta_{10}$ is less than the critical angle at the second interface 72' and so the fifth light ray $66_5$ does not undergo total internal reflection at the second interface 72'. Thus, the fifth light ray $66_5$ propagates back into the substrate 62.

The fifth light $66_5$ follows this path when the tenth angle $\theta_{10}$ satisfies the inequality $(n_3/n_s)<\sin\theta_{10}<(n_1/n_s)$. This occurs when $n_3<n_1$, i.e. when the third refractive index $n_3$ is smaller than the first refractive index $n_1$.

A sixth light ray $66_6$ is incident at the first interface 71 at an eleventh angle $\theta_{11}$ to the normal to the first interface 71. The eleventh angle $\theta_{11}$ is greater than the critical angle at the first interface 71. The sixth light ray $66_6$ undergoes total internal reflection at first interface 71. A third evanescent wave 78 is generated in the first layer 67. The thickness of the first layer 67 is such that the third evanescent wave 78 tunnels through the first layer 67 and a third travelling wave 79 resumes in the second layer 68.

The angle to the normal made by the third travelling wave 79 in the second layer 68 is equal to the angle which would be made if the first layer 67 were not present and the substrate 62 were in direct contact with the second layer 68. The second refractive index $n_2$ is equal to the substrate refractive index $n_s$ and so a twelfth angle of incidence $\theta_{12}$ of the travelling wave 79 at the third interface 68 is equal to the eleventh angle $\theta_{11}$.

When total internal reflection occurs the angles of incidence and reflection are equal. Thus, all subsequent angles of incidence at second and third interfaces 71, 73 are equal to the twelfth angle $\theta_{12}$.

For the third travelling wave 79, the twelfth angle $\theta_{12}$ is greater than the critical angle at the third interface 73 and the travelling wave 79 undergoes total internal reflection. When the first refractive index $n_1$ is greater than the third refractive index $n_3$, the condition for total internal reflection at second interface 72 is equal to the condition for total internal reflection at first interface 71. Thus, any evanescently-coupled travelling wave which undergoes total internal reflection at third interface 73 will subsequently undergo total internal reflection at the second interface 72.

Since all subsequent angles of incidence at the second and third interfaces 72, 73 are equal to the twelfth angle $\theta_{12}$ which is greater than the critical angles at the second and third interfaces 72, 73, the third travelling wave 79 is guided by multiple total internal reflections within the second layer 68.

The guided mode 79 is shown for only the eleventh angle of incidence $\theta_{11}$. It will be appreciated that other angles of incidence which excite guided modes within the second layer 68 will have points of total internal reflection at different locations on the second face 69.

Conditions for Guided Modes in the Second Layer 68

Referring still to FIGS. 6a and 6b, for the first and second multilayer structures $61_1$, $61_2$, the condition for total internal reflection at the third interface 71 is $$n_s \sin \theta > n_3 \quad (1)$$

and the condition for subsequent total internal reflection at second interface 72 is $$n_s \sin \theta > n_1 \quad (2)$$

For values of incidence angle $\theta$ which satisfy both inequalities, light 66 is coupled into a guided mode in the second layer 67.

Waveguide Modes

A single-mode waveguide is a waveguide which supports only one guided mode per wavelength. Typically, a single-mode waveguide has a dimension in the confining direction which is less than the wavelength of the light coupled into the waveguide.

Referring to FIG. 3, for the fluorescence-exciting device 2 in which the second layer 28 has a thickness smaller than the wavelength of the light emitted by light-emitting layer structure 31, a single guided mode can exist at that wavelength. The single guided mode is excited for a resonant angle of incidence at the interface 34 between the substrate 9 and the first layer 25 which is greater than the critical angle at the interface 34. This mode is the fundamental S-polarised mode and may also be referred to as the TEo mode.

For a fluorescence-exciting device 2 in which the second layer 28 has a thickness greater than the thickness required to support only the fundamental TEo guided mode, more than one guided mode may exist. For example, a fundamental P-polarised mode may exist, also referred to as the TMo mode.

Light Propagation Through Multilayer Structures: Metal First Layer

A plasmon is a collective oscillation of an electron gas density. A surface plasmon is a plasmon which exists at a boundary between two media wherein the real part of the dielectric function changes sign across the boundary. The boundary tends to be a dielectric-metal interface.

An oscillating charge radiates energy. Thus a surface plasmon has an associated electromagnetic wave, and the term 'surface plasmon polariton' ("SPP") denotes the combined charge oscillation and associated electromagnetic wave. The intensity of the associated electromagnetic wave decays exponentially in the direction perpendicular to the boundary, and this wave is evanescent. The surface plasmon polariton propagates along the boundary and is thus guided.

Surface plasmon polaritons can be excited by evanescent waves. Due to the momentum-matching condition for surface plasmon excitation, only P-polarised light can excite surface plasmon polaritons.

Figure 7A:
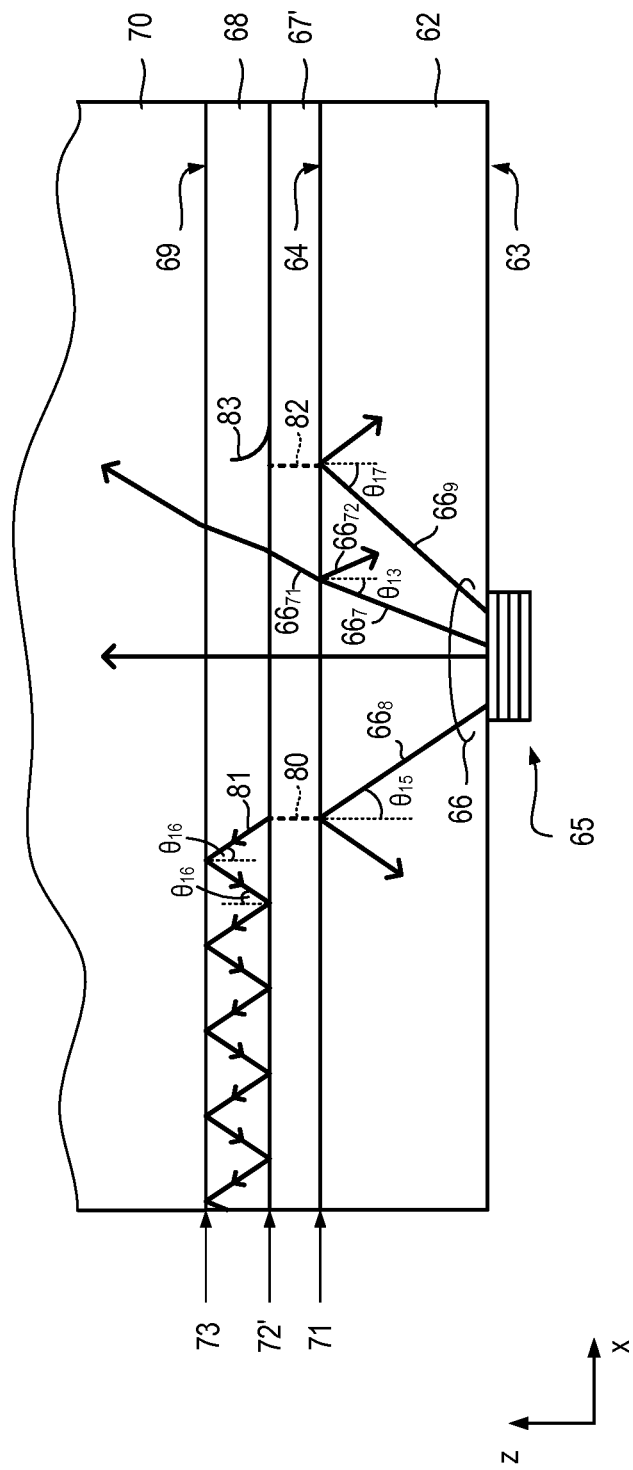
FIGS. 7a and 7b illustrate propagation of light through a multilayer structure including a metal layer.

FIG. 7a illustrates light propagation through a third multilayer device $61_3$. The third multilayer device $61_3$ has a similar structure to the fluorescence-exciting device 2 (FIG. 3) having different values of refractive indices.

Referring to FIG. 7a, the third multilayer device $61_3$ comprises a transparent substrate 62 having first and second opposite faces 63, 64 and a substrate refractive index $n_s$. The substrate 62 supports a light-emitting layer structure 65 directly on the first face 63 of the substrate 62 which is arranged to emit light 66 into the substrate 62 at a range of angles. A modified first layer 67' having a first refractive index $n_1'$ is disposed directly on the second face 64 of the substrate 62 and a second layer 68 having a second refractive index $n_2$ is disposed directly on the first layer 67' and has a free face 69. A medium 70 having a third refractive index $n_3$ is in direct contact with the free face 69 of the second layer 68. The substrate 62 and the second layer 68 comprise dielectric materials. The modified first layer 67' comprises a metal. The refractive index of the modified first layer 67', unless otherwise stated, refers to the real part of the complex refractive index of the metal.

The third refractive index $n_3$ is less than the second refractive index $n_2$ and the substrate refractive index, i.e. $n_3 < n_2, n_s$. In this example, the second refractive index $n_2$ is equal to the substrate refractive index $n_s$, i.e. $n_2 = n_s$. However, the second refractive index $n_2$ may be greater than the substrate refractive index $n_s$, i.e. $n_2 > n_s$. The first refractive index $n_1'$ is smaller than the second refractive index $n_3$, i.e. $n_1' < n_2$. Fourth, fifth, and sixth interfaces 71', 72', 73' are formed between the substrate 62 and the modified first layer 67', between the modified first layer 67' and the second layer 68 and between the second layer 68 and the medium 70.

A seventh light ray $66_7$ is incident at the fourth interface 71' at a thirteenth angle $\theta_{13}$ to the normal to fourth interface 71'. A first portion $66_{71}$ of the seventh light ray $66_7$ propagates through the substrate 62, the modified first layer 67', and the second layer 68, and into the medium 70. A second portion $66_{72}$ of the seventh light ray $66_7$ is reflected at the fourth interface 71'. The amount of light in each portion $66_{71}$, $66_{72}$ is dependent upon the wavelength of the light and the properties of the materials which the substrate 62 and modified first layer 67' comprise.

An eighth light ray $66_8$ is incident at the fourth interface 71' between the substrate 62 and the modified first layer 67' at a fifteenth angle $\theta_{15}$ to the normal to the fourth interface 71'. The fifteenth angle $\theta_{15}$ is equal to a first resonance angle at the fourth interface 71', wherein the first resonance angle is an angle of incidence at the fourth interface 71' required to excite a waveguide mode in the second layer 68. The eighth light ray $66_8$ undergoes total internal reflection at the fourth interface 71'. A fourth evanescent wave 80 is generated in the modified first layer 67'. The thickness of the modified first layer 67' is such that the fourth evanescent wave 80 tunnels through the modified first layer 67' and a fourth travelling wave 81 resumes in the second layer 68.

A sixteenth angle of incidence $\theta_{16}$ of the travelling wave 81 at second interface 73 is greater than the critical angle at interface 73' and the critical angle at interface 72'. When total internal reflection occurs at an interface, the angles of incidence and reflection are equal. Thus, all subsequent angles of incidence at interfaces 72', 73' are equal to the sixteenth angle of incidence $\theta_{16}$. The fourth travelling wave 81 is guided by multiple total internal reflections within the second layer 68.

The guided mode 81 is shown for only one angle of incidence, namely the fifteenth angle of incidence $\theta_{15}$. It will be appreciated, however, that other angles of incidence which excite waveguide modes within the second layer 68 will have points of total internal reflection at different locations on the second face 69.

A ninth light ray 66$_9$ is incident at the fourth interface 71' between the substrate 62 and the modified first layer 67' at a seventeenth angle $\theta_{17}$ to the normal to the fourth interface 71'. The seventeenth angle $\theta_{17}$ is equal to a second resonance angle at the fourth interface 71', wherein the second resonance angle is an angle of incidence at the fourth interface 71' required to excite a surface plasmon polariton mode at the fifth interface 72'. The ninth light ray 66$_9$ undergoes total internal reflection at the fourth interface 71'. A fifth evanescent wave 82 is generated in the modified first layer 67'.

The fifth evanescent wave 82 excites a surface plasmon polariton mode 83 at the fifth interface 72'. The surface plasmon polariton 83 propagates along the fifth interface 72' (that is, along the x axis). The intensity of the surface plasmon polariton 83 decays exponentially in the z and the x directions, that is, in the direction of the normal to the fifth interface 72' and in the direction which is perpendicular to the normal and in the plane of incidence. For clarity, only the exponential decay in the x direction is shown.

The surface plasmon polariton mode 83 is described for only one angle of incidence, namely the seventeenth angle of incidence $\theta_{17}$. It will be appreciated, however, that there are other angles of incidence which excite surface plasmon polariton modes at the fifth interface 72.

Figure 7B:
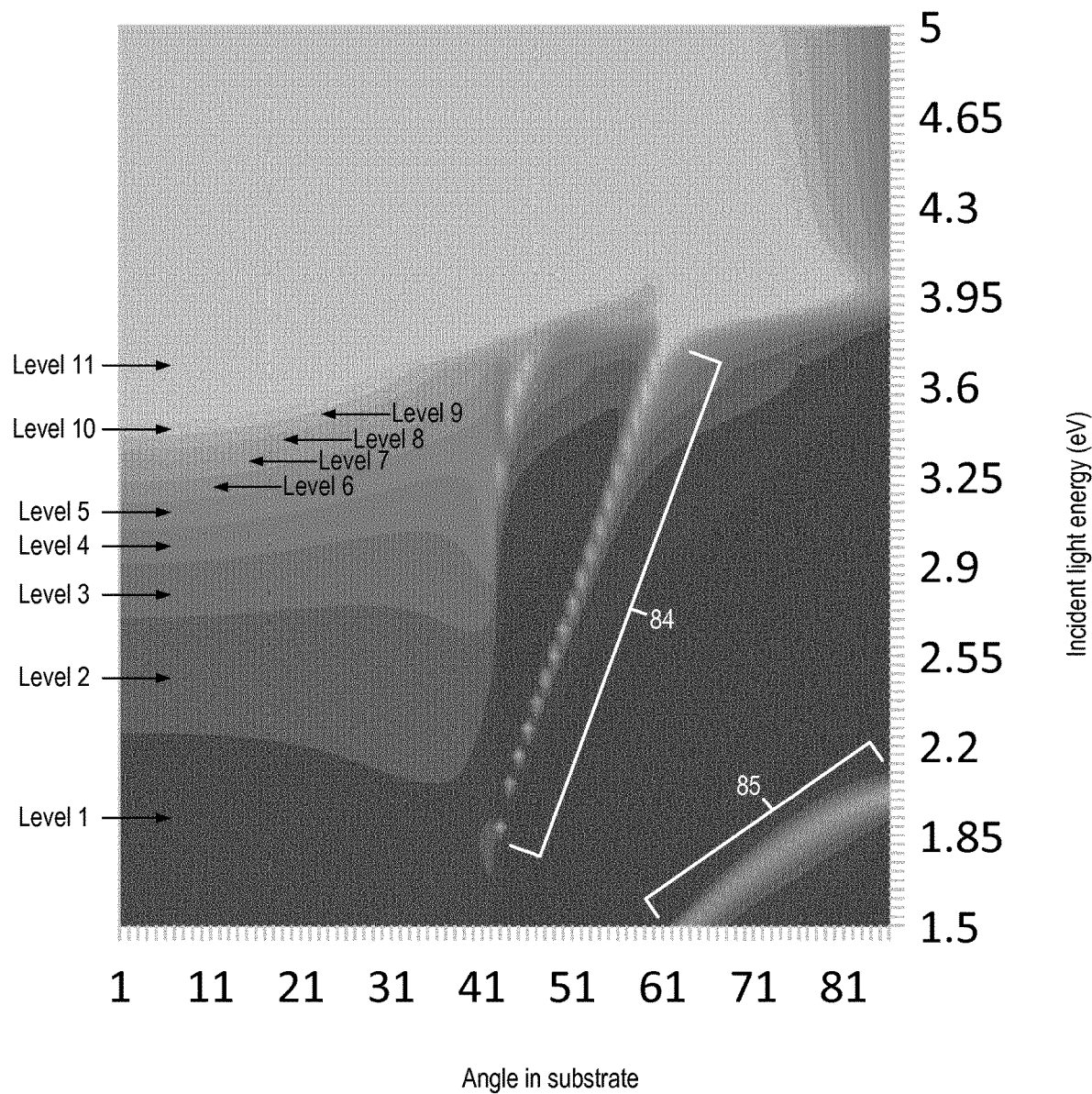

FIG. 7b shows a calculated dispersion plot for a multilayer device having the layer structure of multilayer device 61$_3$, wherein the modified first layer 67' comprises a layer of silver (Ag) with a thickness of 40 nm, and the second layer 68 comprises a layer of silicon dioxide ($SiO_2$) with a thickness of 130 nm. These materials and layer thicknesses are not prescriptive and are provided as an example only. Other materials and layer thicknesses may be used.

The plot shows the reflectance of light incident at the fourth interface 71' at various angles (horizontal axis) and with various energies (vertical axis). The reflectance is indicated by grayscale value, with darker shades (low numbers) indicating higher reflectance values and lighter shades (high numbers) indicating lower reflectance values. For example, it can be seen that incident light having energy greater than 4.5 eV (electron volts) is substantially transmitted by the multilayer device 61$_3$ at incidence angles less than approximately 65°.

The low reflectivity spots denoted by reference numeral 84 show combinations of angle of incidence and incident light energy at which excitation of fundamental S-polarised (TEo) guided modes within the second layer occurs. These guided modes are excited by coupling from an evanescent wave produced when total internal reflection occurs at the fourth interface 71'. These modes are guided by multiple total internal reflections at the fifth and sixth interfaces 72' and 73'.

The low reflectivity spots denoted by reference numeral 85 show combinations of angle of incidence and incident light energy at which excitation of fundamental P-polarised surface plasmon ("SPo") modes occurs.

It is seen from FIG. 7b that at certain energies of incident light, a TEo mode and an SPo mode can exist simultaneously. For example, light at 1.9 eV can excite a TEo mode when incident at 41° and an SPo mode when incident at 78°.

Thus by choosing appropriate combination(s) of angles of incidence and wavelength(s) of incident light, more than one type of guided mode may be excited.

The multilayer device for which the dispersion plot of 7b is calculated has a second layer 68 with a thickness such that only a fundamental surface plasmon mode (in this case, the SPo mode) is supported at the interface between the first layer 67' and the second layer 68. Other values for the thickness of the second layer 68 are possible and such values may allow higher order surface plasmon modes to be supported.

Evanescent Wave-Excited Fluorescence

Figure 8:
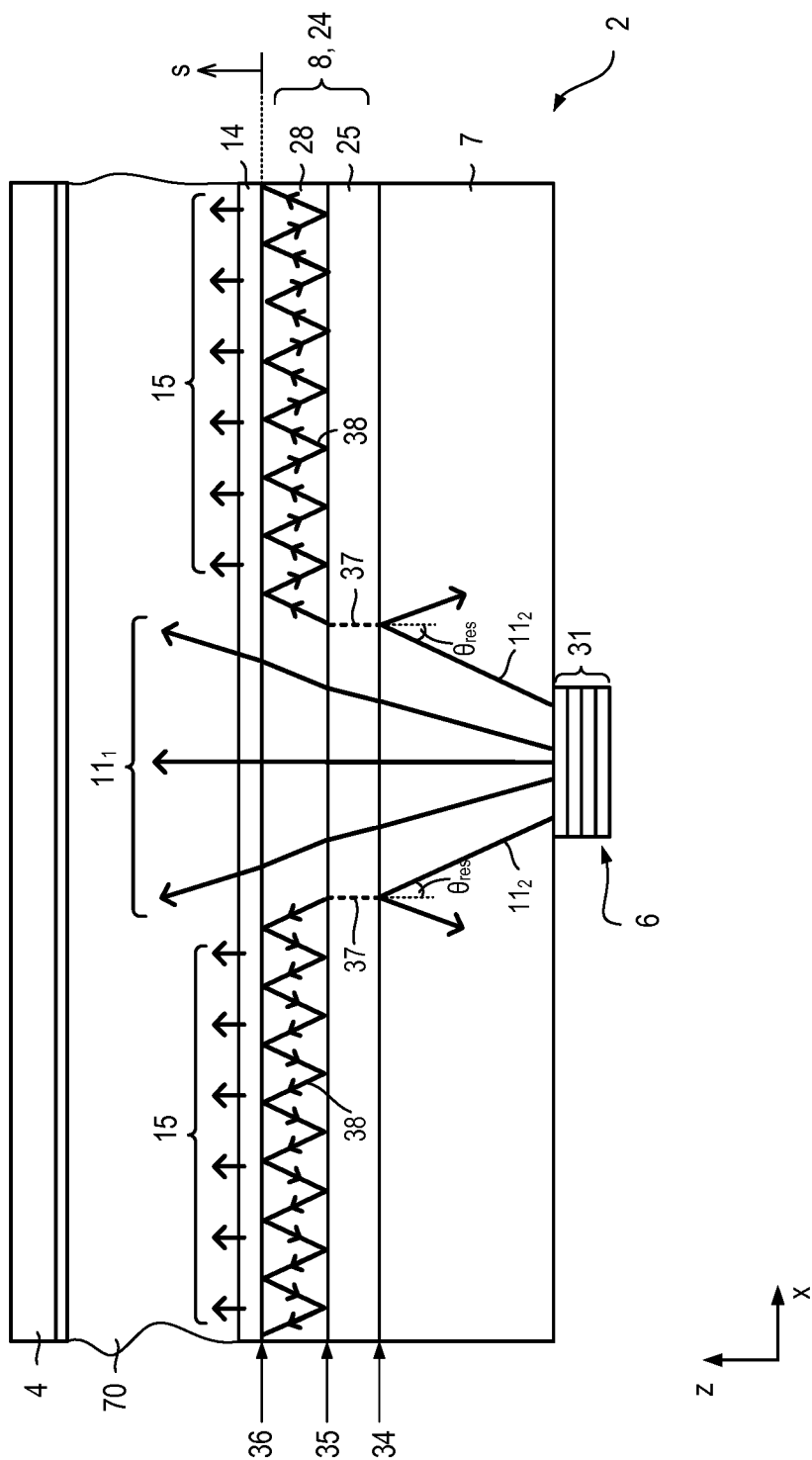
FIG. 8 schematically illustrates fluorescence emission from a fluorescent layer adjacent to a device for optically exciting fluorescence.

Referring to FIG. 8, the fluorescence-exciting device 2 and detector 4 are shown.

The fluorescence-exciting device 2 includes a fluorescent region 14 in the form of a fluorescent layer disposed on the second face 30 of the second layer 28. The first layer 25 comprises a dielectric material. However, the first layer 25 may comprise a metal. The second layer 28 has a thickness $t_2$ (FIG. 3) such that the waveguide 8 has a single mode. The fluorescent layer 14 may comprise a captured fluorescent or phosphorescent biomarker tag, for example, one or more of fluorescein, quantum dots, phosphorescent markers, conjugated polymer nanoparticles.

The optical detector 4 overlies and is spaced from the fluorescent region 14 and is directed at the fluorescent region 14 so as to capture fluorescent light 15.

In the manner hereinbefore described earlier, the light-emitting structure 31 emits light 11 which is guided by the multilayer structure 24 having first, second and third interfaces 34, 35, 36 between the substrate 7 and the first layer 25, the first layer 25 and the second layer 28 and the second layer 28 and the fluorescent region 14 respectively.

First and second sets of light rays 11$_1$, 11$_2$ are schematically shown.

Light rays 11$_1$ emitted at an angle less than the resonant angle of incidence $\theta_{res}$ do not couple to a guided mode within the second layer 28. Light rays 11$_2$ emitted at the resonant angle of incidence $\theta_{res}$ result in evanescent waves 37 being generated within the first layer 25 which give rise to travelling waves 38 which are guided within the second layer 28.

The travelling waves 38 have points of total internal reflection at the third interface 36. At each point of total internal reflection, an evanescent wave (not shown) is generated. The evanescent wave generated by a mode in the single-mode waveguide decays such that there is substantially no intensity at a distance greater than half a wavelength of the light from the waveguide interface. The evanescent wave extends into the fluorescent layer 14 and may overlap with a fluorophore. The fluorophore may absorb a photon from the evanescent wave and subsequently emit a photon as fluorescence 15. The emitted photon may be emitted in any direction. In FIG. 8, the emitted fluorescence shown is directed towards the detector for clarity.

The detector 4 detects emitted fluorescence 15 and light 11$_1$ which passes through the waveguide 8 without being coupled into a guided mode.

The detector 4 may comprise a layer of light-sensitive organic material. The detector 4 may comprise a spectrometer. The detector 4 may comprise a photodiode or charge-coupled device (CCD).

The absorption of a photon by a fluorophore removes energy from travelling waves 38. Thus, after each total internal reflection at the third interface 36, the intensities of travelling waves 38 are reduced. The intensity of the fluorescence 15 decreases with increasing distance away from the light-emitting layer structure 31.

Figure 9:
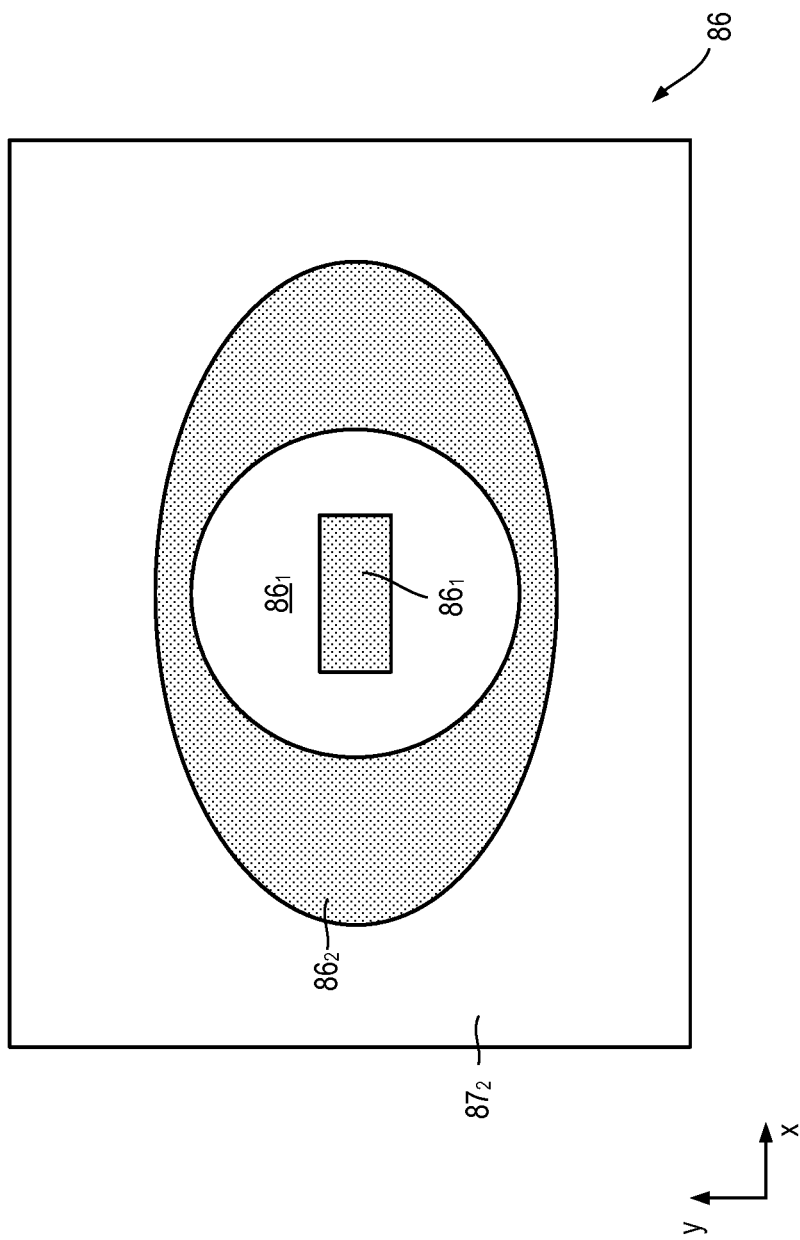
FIG. 9 is a plan view of the device shown in FIG. 7 showing fluorescence emission.

Referring also to FIG. 9, a plan view of a light pattern 86 output from the fluorescence-exciting device 2 is shown. The light pattern 86 includes a central region 86$_2$ corresponding to light 11 emitted by the light-emitting layer structure 31 and which propagates through the first and second layers 25, 28 without reflection. The central light region $86_2$ is surrounded by a first dark region $82_1$ corresponding to angles of incidence at the interface 25 for which a guided mode is not excited in the second layer 28 and no light escapes the waveguide 8.

The dark region 87 is surrounded by annular light region $86_2$ corresponding to fluorescence 15 resulting from excitation of fluorophores within fluorescent layer 14 by photons comprised in evanescent waves generated at points of total internal reflection at the third interface 36. The annular light region $86_2$ is surrounded by a second dark area $87_2$ corresponding to no fluorescence and no excitation light.

The light $11_1$ which passes through the waveguide 8 without being coupled into a guided mode may be several orders of magnitude more intense than the fluorescence 15. This may result in reduced sensitivity of the detector 4 to the fluorescence 15 and, thus, a poor signal-to-noise ratio.

Figure 10:
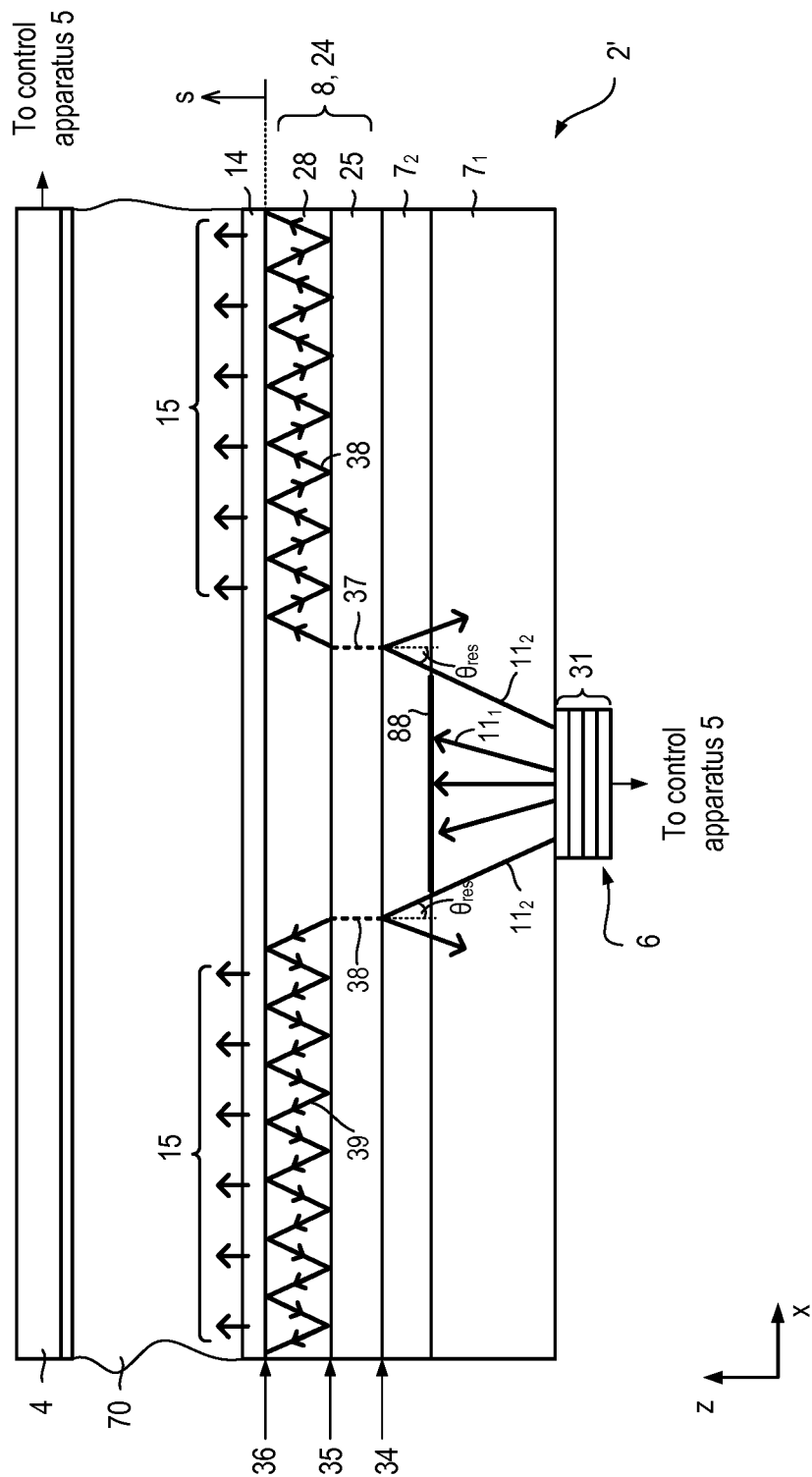
FIG. 10 schematically illustrates fluorescence emission from a fluorescent layer adjacent to a device for optically exciting fluorescence which includes a light stop.

Referring to FIG. 10, a modified fluorescence-exciting device 2' and detector 4 are shown.

The modified fluorescence-exciting device 2' is the same as the fluorescence-exciting device 2 shown in FIG. 9 except that substrate 7 includes first and second layers $7_1$, $7_2$ having the same refractive index, i.e. substrate refractive index $n_s$, and which are joined together using, for example, index-matching epoxy (not shown), and a light stop 88 interposed between the first and second layers $7_1$, $7_2$. The light stop 88 lies on the central axis 32 and extends sufficiently laterally such that any light $11_1$ emitted from the light-emitting layer structure 31 which does not couple into a guided mode in second layer 28 is absorbed by the light stop 88.

The light stop 88 may be placed at other positions. For example, the light stop may be interposed between the substrate 7 and the multilayer stack 24. It will be appreciated that the lateral extent of the light stop is adjusted according to separation from the light-emitting layer structure 31 so as to provide appropriate angular coverage.

Figure 11:
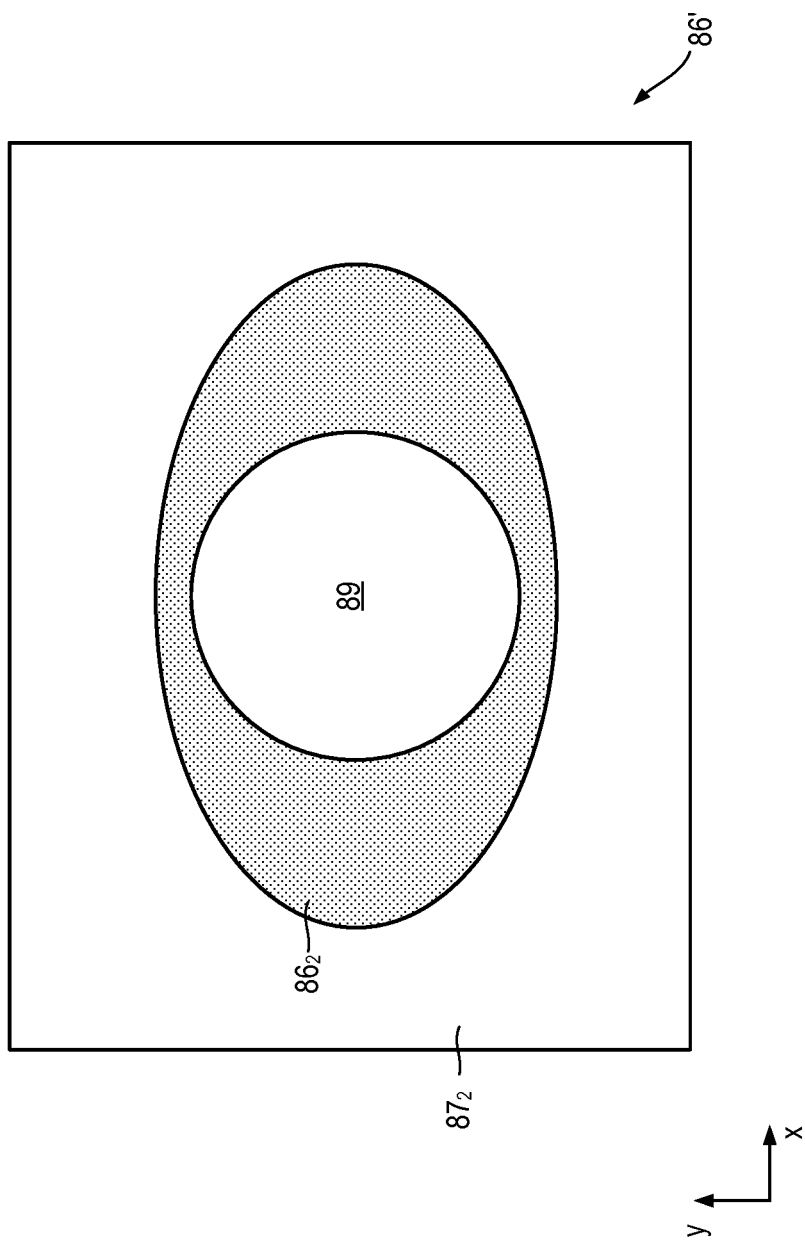
FIG. 11 is a plan view of the device shown in FIG. 9 showing fluorescence emission.

Referring also to FIG. 11, a plan view of a modified light pattern 86' output from the modified fluorescence-exciting device 2' is shown. The light pattern 86' no longer includes a central region $86_1$ (FIG. 9) and instead includes a central dark region 89 within the annular light region $86_2$.

Metal First Layer

As explained hereinbefore, when the first layer 25 comprises a metal, guided surface plasmon polariton modes may exist at the interface 35 between the first layer 25 and the second layer 28, in addition to modes which are guided within the second layer 28 by multiple total internal reflections. These surface plasmon polariton modes include an evanescent electromagnetic wave component.

The evanescent field of the surface plasmon polariton mode can excite a fluorophore in a manner similar to the excitation of a fluorophore by the evanescent field of a waveguide mode, as described in the previous section. Thus the skilled person will readily appreciate that the methods and devices described in the preceding and following sections apply to devices in which the first layer 25 comprises a dielectric material and to devices in which the first layer 25 comprises a metal. In particular, any reference to a first layer 25 comprising a dielectric material or having the characteristics of a dielectric material is not to be considered to exclude devices or methods in which the first layer 25 comprises a metal.

Analyte-Specific Sensor

Referring again to FIG. 1, the waveguide-based fluorescence sensing apparatus 1 may be used to test for the presence (or absence) of a specific analyte in a sample 3.

To provide specificity, an analyte-specific receptor may be provided to which the analyte may bind. The receptor may include a fluorescent label. Additionally or alternatively, the analyte may include a fluorescent label. The fluorescence 15 emitted by the fluorescent label may be modified, for example in wavelength or intensity, when the analyte binds to the receptor.

By monitoring fluorescence 15, the properties of the sample under test, the analyte and the receptor may be determined. These properties may include, but are not limited to, the presence of the analyte within the sample, the concentration of the analyte within the sample, the rate at which the analyte binds to the receptor.

Examples of analytes and suitable receptors include antibodies which may bind to antigens and immunoglobins which may bind to binding proteins.

A suitable fluorescent label may comprise a fluorophore, a quantum dot, a protein, a fluorescent dye.

Figure 12:
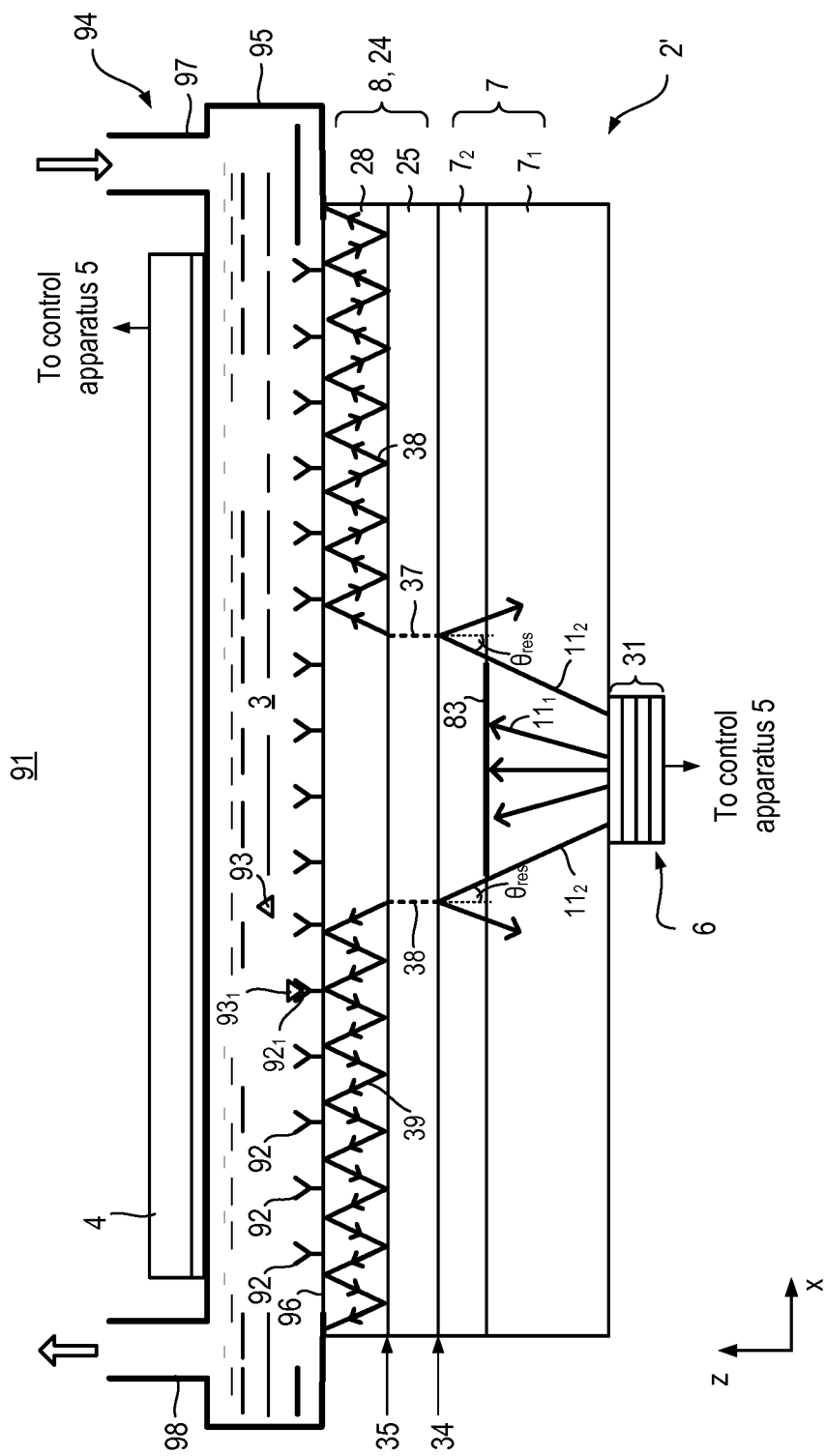
FIG. 12 shows a device for optically exciting fluorescence, a device for presenting a sample to the device and a detector.

Referring to FIG. 12, a sensor 91 which includes a modified fluorescence-exciting device 2' and detector 4 is shown.

A layer of receptors 92 is disposed on the second face 30 of the second layer 28. The receptors 92 include fluorescent labels (not shown) thereby providing fluorescent regions 14 (FIG. 3). The receptors 92 are selected so as to bind with an analyte 93 to be detected which may be contained in a sample 3.

The fluorescence-exciting device 2' is coupled to a device 94 for holding and presenting the sample 3 to fluorescence-exciting device 2'. The device 94 is arranged to allow the sample 3 to flow continuously past the fluorescence-exciting device 2', i.e. takes the form of a flow cell. The device 94, however, may hold and present a fixed or static volume of sample 3.

The device 94 comprises a housing 95 which provides a channel having an aperture 96 which allows the sample 3 to be brought into direct contact with the second face 30 of the second layer 28. The device includes first and second ports 97, 98 in fluid communication with the channel 95 for providing inlet and outlet respectively. At least a portion of the housing 95 is transparent so as to allow fluorescence to reach the detector 4.

An evanescent field generated by a guided mode within second layer 28 overlaps with the receptors 92. Fluorescent labels 14 (FIG. 3) absorb photons from the evanescent field and subsequently emit fluorescence 15. The fluorescence 15 is emitted towards the detector 4.

When an analyte particle $93_1$ passes close to a receptor $92_1$, the analyte particle $93_1$ may bind to the receptor $92_1$. During and/or after binding, the fluorescence emitted by the fluorescent label of the receptor $92_1$ is modified, for example, in wavelength and/or intensity.

Thus, monitoring of the intensity of light received by the detector 4 can give information on, for example, the presence of an analyte 93, the concentration of analyte 93 and binding rate of analyte 93 and receptor 92.

Such information can be used to determine the concentration of a biomarker indicating a disease. For example, a concentration of myoglobin in blood greater than a specific value may indicate acute myocardial infarction.

As described previously, the evanescent field decays such that there is substantially no intensity at a distance greater than half a wavelength of the light from the waveguide interface. This can allow spatially selective sensing, wherein analyte particles 92 which bind to receptors 92 on second face 20 of second layer 28 may be detected without interference from contaminants in the bulk of the sample 3.

Figure 13:
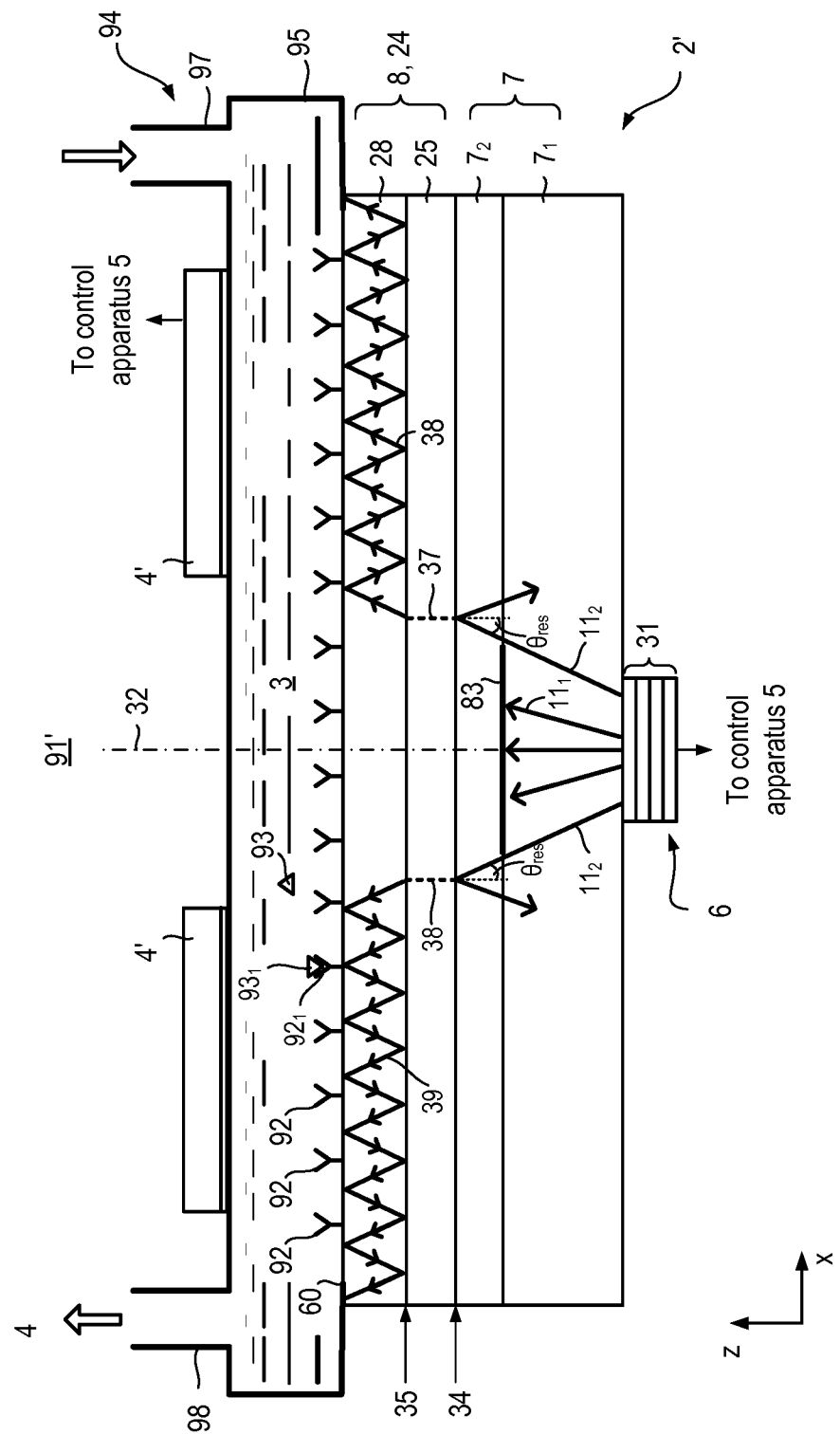
FIG. 13 shows a device for optically exciting fluorescence, a device for presenting a sample to the device and a detector.

Referring to FIG. 13, another sensor 91' which includes a modified fluorescence-exciting device 2' and shaped detector 4' is shown.

The sensor 91' is the same as the sensor 91 (FIG. 12) described earlier, except that the detector 4' is shaped in the form of a ring which is which is concentric with the central axis 32.

The waveguide-based fluorescence sensing system 1 and sensors 91, 91' including the waveguide-based fluorescence sensing system 1 can have one or more advantages. For example, the fluorescence-exciting device 2 can be fabricated using materials and processes which allow the device to be shaped, e.g. to fit with another structure (such as a pipe) or a body (such as a plant), and/or to be easily and quickly produced in large quantities. An integrated light source 6 can make it easier to align the light source 6 with the rest of device. The waveguide-based fluorescence sensing system 1 does not require external light sources and may be battery powered, allowing the system to be portable and/or hand held.

The sensor 91' including a ring-shaped detector can provide improved fluorescence collection efficiency with low levels of background from the light source 6.

A fluorescence-exciting device 2 having a light source 6 with an emission spectrum broad enough to substantially excite more than one type of fluorescent marker can allow simultaneous monitoring of different markers.

The rapid decay of the evanescent field 13 within the sample can allow selective excitation of target molecules close to the second layer without substantial scattering of excitation light by non-target molecules. This can provide an improved signal to noise ratio.

Organic Light Emitting Diode

Referring again to FIG. 3, the fluorescence-exciting device 2 employs a light source 6 which is integrated with the rest of the device 2. In particular, the light source 6 comprises a light-emitting layer structure 31 which is formed on the substrate 7.

The light-emitting layer structure 31 may comprise an organic light-emitting diode (OLED).

Figure 14:
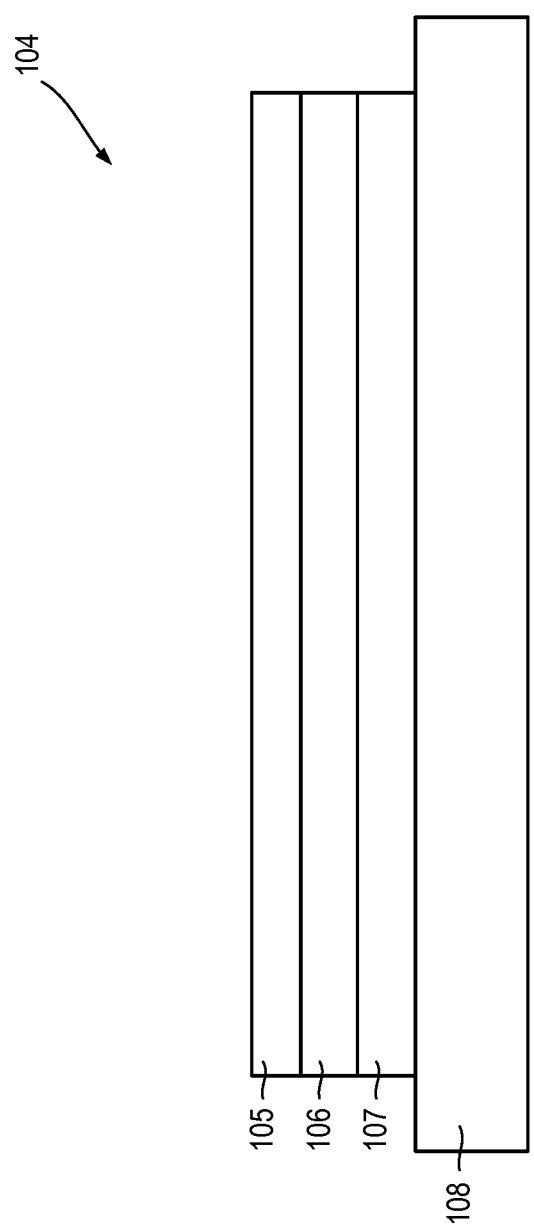
FIG. 14 is a cross-sectional view of an organic light emitting diode.

Referring to FIG. 14, an organic light-emitting diode (OLED) 104 is shown.

The OLED 104 comprises a cathode 105, an anode 107 and a light-emitting layer 106 between the cathode 105 and anode 107. The device 104 is supported on an OLED substrate 108, for example a glass or plastic substrate.

One or more further layers may be provided between the anode 105 and cathode 107 including, without limitation, hole injection, hole transport, electron injection, electron transport, hole blocking and electron blocking layers. The hole injection layer may comprise, for example, PEDT. Further examples of materials for use in such layers are given in Y. Shirota and H. Kageyama: "Charge Carrier Transporting Molecular Materials and Their Applications in Devices", Chem. Rev., 2007, 107 (4), pp 953-1010, the contents of which are incorporated herein by reference.

The device structure may be selected from:
Anode/Hole-injection layer/Light-emitting layer/Cathode
Anode/Hole transporting layer/Light-emitting layer/Cathode
Anode/Hole-injection layer/Hole-transporting layer/Light-emitting layer/Cathode
Anode/Hole-injection layer/Hole-transporting layer/Light-emitting layer/Electron-transporting layer/Cathode Light-emitting layer 106 contains at least one light-emitting material. Light-emitting material 106 may comprise a single light-emitting compound or may be a mixture of more than one compound, optionally a host doped with one or more light-emitting dopants. Light-emitting layer 106 may contain at least one light-emitting material that emits phosphorescent light when the device is in operation, or at least one light-emitting material that emits fluorescent light when the device is in operation. Light-emitting layer 106 may contain at least one phosphorescent light-emitting material and at least one fluorescent light-emitting material. Examples of light-emitting materials are given in "Organic Light-Emitting Materials and Devices", CRC Press, 2007, the contents of which are incorporated herein by reference.

The cathode 107 may comprise of a single layer of a conductive material, optionally a layer of metal such as a layer of aluminium, or it may comprise of a plurality of layers of conductive materials such as metals, optionally a bilayer of a low work function material and a high work function material such as calcium and aluminium, for example as disclosed in WO 98/10621 A1, the contents of which are incorporated herein by reference. The cathode 107 may comprise a 1-5 nm thick layer of metal compound, optionally an oxide or fluoride of an alkali or alkali earth metal, between the organic layers of the device and one or more conductive cathode layers, optionally one or more metal layers, for example lithium fluoride as disclosed in WO 00/48258 A1, the contents of which are incorporated herein by reference.

"Low work function" of a conductive material as described herein means a work function of less than 3.5 eV, optionally no more than 3.2 eV, from vacuum. "High work function" of a conductive material as described herein means a work function of at least 3.5 eV, optionally at least 3.7 eV or at least 4 eV, from vacuum. Work functions of metals are as given in CRC Handbook of Chemistry and Physics, 87th Edition, 2007, p. 12-114, published by CRC Press, edited by David R. Lide. In use, light is emitted through the anode 105 and/or cathode 107. Preferably, one of the anode and cathode is transparent and the other of the anode and cathode is opaque. Optionally, the opaque electrode is reflective.

The anode may be a single layer or may comprise two or more layers. In the case where light is emitted through the anode, it is optionally a layer of indium tin oxide (ITO) or indium zinc oxide (IZO). The anode may comprise a thin metal layer, for example a layer of silver (Ag) with a thickness of 20 nm. This can allow control of the direction of light emission.

Detector

The detector 4 may comprise an organic photodetector. The organic photodetector may comprise a layer structure such as that hereinbefore described.

Static Reactor

Figure 15:
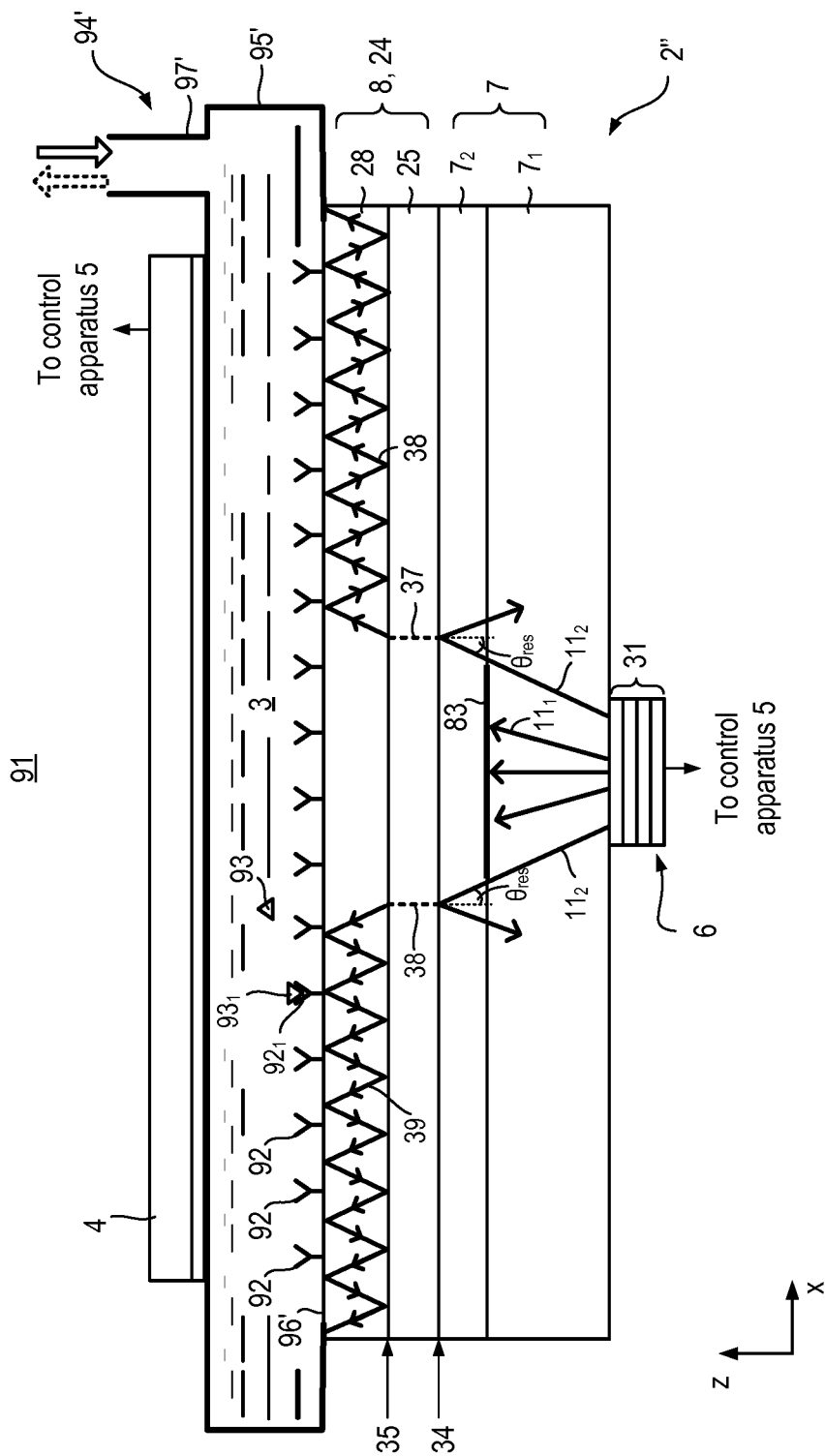
FIG. 15 shows a device for optically exciting fluorescence, a device for presenting a sample to the device and a detector.

Referring to FIG. 15, the fluorescence-exciting device 2' is shown. The fluorescence-exciting device 2' is coupled to a modified device 94' for holding and presenting the sample 3 to the fluorescence-exciting device 2'. The device 94' is arranged to hold and present a fixed volume of sample 3 to fluorescence-exciting device 2'.

The device 94' comprises a housing 95' which provides a static reactor or 'bath' having an aperture 96' which allows the sample 3 to be brought into direct contact with the second face 30 of the second layer 28. The device includes a first port 97' in fluid communication with the channel 95 for providing an inlet. The first port 97' may also provide an outlet. At least a portion of the housing 95' is transparent so as to allow fluorescence to reach the detector 4.

Control Circuit

Referring again to FIG. 1, at least some of the control apparatus 5 may be carried on the substrate 7.

Figure 16:
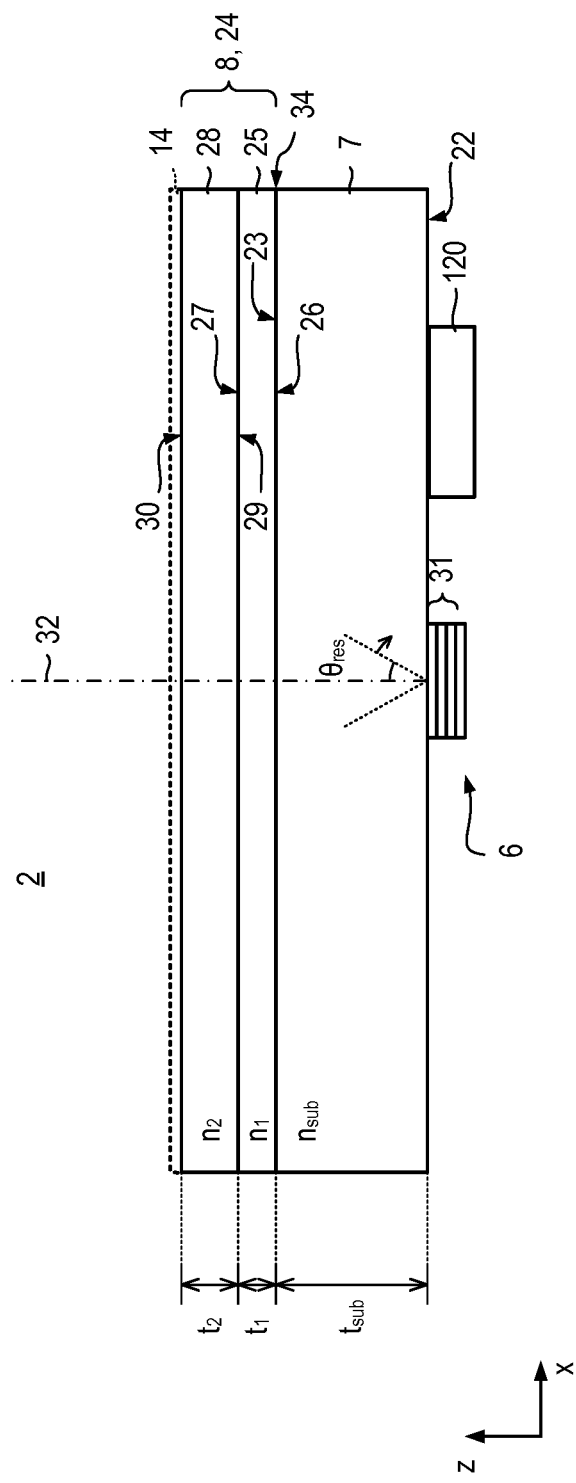
FIG. 16 shows a device for optically exciting fluorescence including a circuit.

Referring to FIG. 16, a modified fluorescence-exciting device 2" is shown. The fluorescence-exciting device 2" carries a circuit 120 on the first face 22 of the substrate 7. The circuit 120 is in communication with the light source 6. The circuit 120 may include amplifiers (not shown). The circuit 120 may be formed from solution-processable transistors (not shown). The circuit 120 may comprise any of a controller, for example a microcontroller, an output device for signalling a result of a measurement, a power source. The circuit may comprise a monolithic integrated circuit. The power source may comprise a thin film battery or photovoltaic cell.

The circuit 120 may be bonded to the substrate 7. The circuit 120 may be formed on another substrate (not shown) mounted to the substrate 7.

Fabrication

Figure 17:
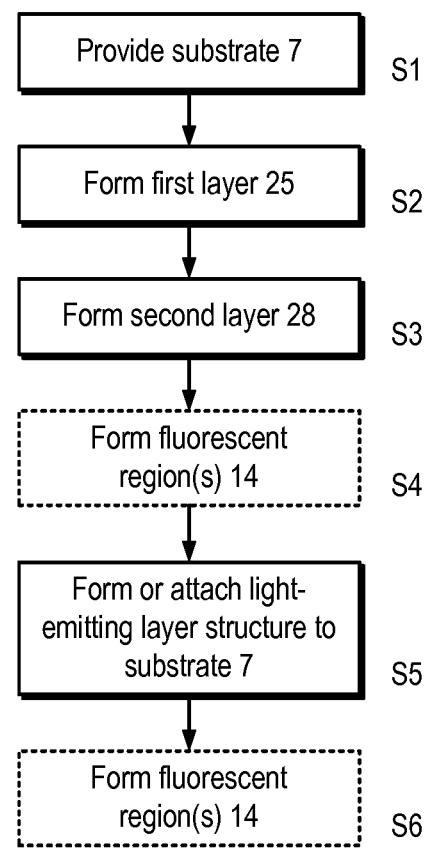
FIG. 17 is a process flow diagram of a method of fabricating a device.

Referring to FIGS. 3 and 17, a method of fabricating the fluorescence-exciting device 2 will now be described.

The substrate 7 is provided (step S1). A first layer 25 is formed on the substrate 7, for example, using a printing process, a chemical deposition process or a physical deposition process (step S2). A second layer 28 is formed on first layer 25, for example, using a printing process, a chemical deposition process or a physical deposition process (step S3). Optionally, a fluorescent layer 14 (or a layer which contains fluorescent material) may be formed, for example, by a solution-based process (step S4).

The light-emitting layer structure is provided on the substrate (step S5). It will be appreciated that the light-emitting layer structure may be provided first, before the first and second layers 25, 28 are provided. Furthermore, the light-emitting layer structure may be formed separately and then attached to the substrate 7.

Optionally, the fluorescent layer 14 (or a layer which contains fluorescent material) may be formed once the rest of the device 2 has been formed (step S6).

Figure 18:
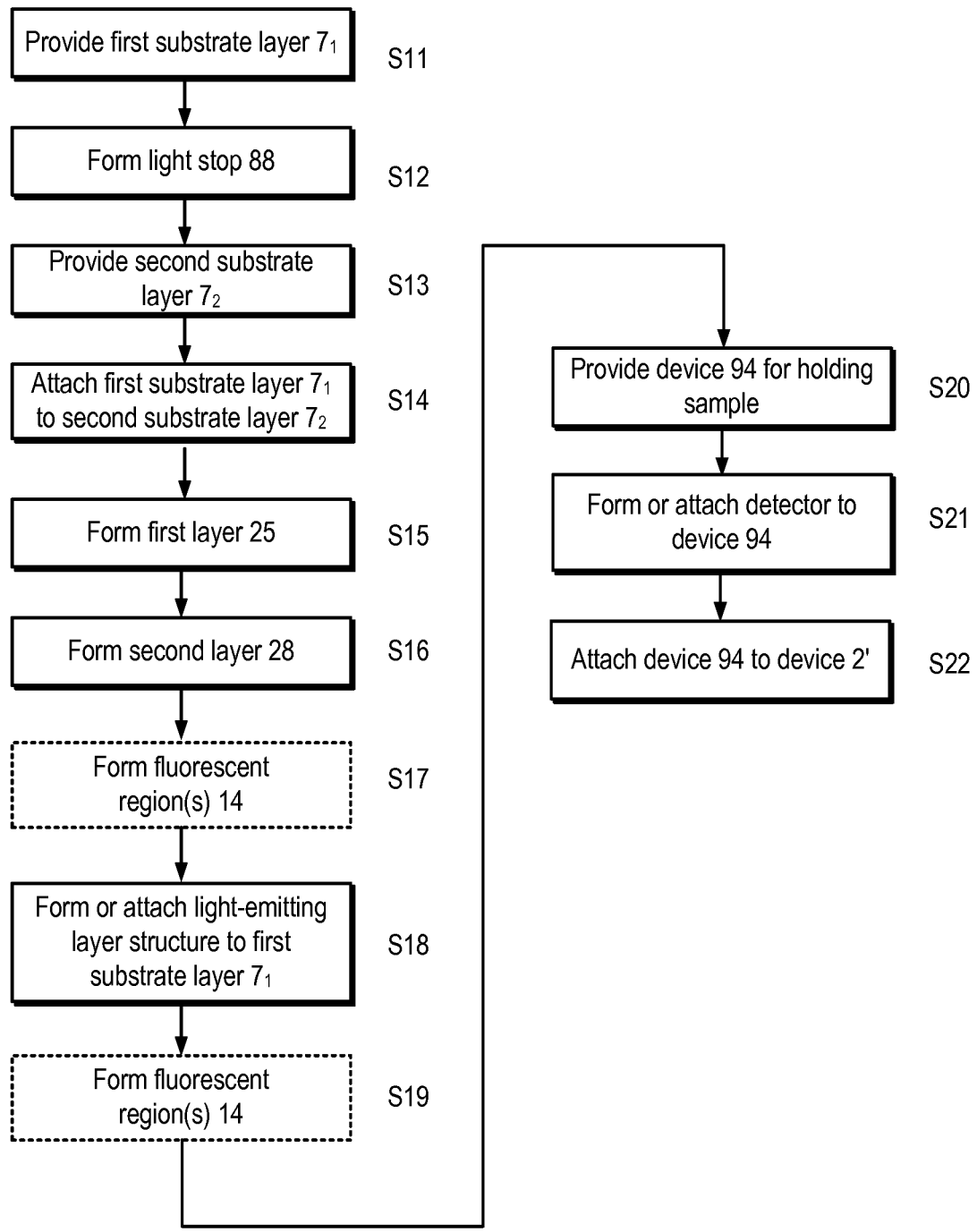
FIG. 18 is a process flow diagram of a method of fabricating a device for optically exciting fluorescence, a device for presenting a sample to the device for optically exciting fluorescence, and a detector.

Referring to FIGS. 12 and 18, a method of fabricating the sensor 91 will now be described.

The first substrate layer $7_1$ is provided (step S11). The light stop 88 is formed on a first face of the first substrate layer $7_1$ (step S12). The second substrate layer $7_2$ is provided (step S13). The first face of the first substrate layer $7_1$ is bonded to a first face of the second substrate layer $7_2$ using, for example, index-matching epoxy, such that the light stop 88 is interposed between the first and second layers $7_1$, $7_2$ (step S14).

A first layer 25 is formed on a second face of the second substrate layer $7_2$, for example, using a printing process, a chemical deposition process or a physical deposition process (step S15). The second face of the second substrate layer $7_2$ is opposite the first face of the second substrate layer $7_2$. A second layer 28 is formed on first layer 25, for example, using a printing process, a chemical deposition process or a physical deposition process (step S16). Optionally, a fluorescent layer 14 (or a layer which contains fluorescent material) may be formed, for example, by a solution-based process (step S17).

The light-emitting layer structure is provided on the second face of the first substrate layer $7_1$ (step S18). The second face of the first substrate layer $7_1$ is opposite to the first face of the first substrate layer $7_1$. It will be appreciated that the light-emitting layer structure may be provided first, before the first and second layers 25, 28 are provided. Furthermore, the light-emitting layer structure may be formed separately and then attached to the first substrate layer $7_1$.

Optionally, the fluorescent layer 14 (or a layer which contains fluorescent material) may be formed once the rest of the device 2' has been formed (step S19).

Steps S11 to S19 provide a modified fluorescence-exciting device 2'.

The device 94 for holding and presenting the sample to fluorescence-exciting device 2' is provided (step S20). The detector 4 is formed on the device 94 (step S21). The device 94 is attached to the device 2' (step S22).

The detector 4 may be formed separately and then attached to the device 94.

Modifications

It will be appreciated that various modifications may be made to the embodiments hereinbefore described. Such modifications may involve equivalent and other features which are already known in the design, manufacture and use of waveguides, detectors and/or light-emitting diodes and which may be used instead of or in addition to features already described herein. Features of one embodiment may be replaced or supplemented by features of another embodiment.

For example, the device may be immersed in the sample and the receptacle may not be required.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A device for optically exciting fluorescence, the device comprising:
    a transparent substrate having first and second opposite faces; and
    a multilayer stack disposed on the second face of the substrate comprising a first layer having first and second opposite faces and a first refractive index and a second layer having first and second opposite faces and a second refractive index, wherein the first face of the first layer is disposed on the second face of the substrate and the first face of the second layer is disposed on the second face of the first layer such that the first layer is interposed between the second layer and the substrate and wherein the substrate has a third refractive index and wherein the first refractive index is less than the second refractive index and the third refractive index; and
    a light source carried by the first face of the substrate and arranged to emit light towards the first face of the first layer;
    wherein the first layer comprises a metal.

2. A device according to claim 1, wherein the substrate is flexible.

3. A device according to claim 1, wherein the light source comprises a layer structure which includes a light-emitting layer.

4. A device according to claim 1, wherein the light source is configured so as to emit light anisotropically into the substrate such that intensity of light emitted within an angular range centered at a first angle between a central axis or plane which is perpendicular to an interface between the substrate and light source is different to intensity of light emitted within the same angular range centered at a second, different angle between the central axis or plane and light source.

5. A device according to claim 1, wherein the device comprises at least two light sources.

6. A device according to claim 1, wherein the second layer has a thickness such that only a fundamental surface plasmon mode is supported at an interface between the first layer and the second layer.

7. A device according to claim 1, wherein light emitted from the light source comprises a first portion emitted within an angular range about a central axis or plane and a second portion emitted outside the angular range, wherein the device further comprises:
 a light stop arranged to block the first portion of the light.

8. A device according to claim 1, wherein the device further comprises a layer of receptors for binding to a specific analyte, the receptors comprising a fluorescent material.

9. A device according to claim 1, wherein at least a portion of the multilayer stack is disposed in a ridge.

10. A device according to claim 1, wherein the second face of the second layer has a patterned surface including at least one feature.

11. A device according to claim 10, wherein the feature has a lateral characteristic dimension of between 1 μm and 10 mm.

12. A device according to claim 1, further comprising:
 a circuit carried by the substrate which is in communication with the light source wherein the circuit includes:
 a circuit portion comprising solution-processable transistors.

13. A lab-on-a-chip device comprising:
 a device according to claim 1; and
 a fluidic circuit including a port for providing a sample in fluid communication with a channel, wherein at least a portion of the channel is arranged so as to present the sample to the second face of the second layer or to a region over the second face of the second layer.

14. A device for optically exciting fluorescence, the device comprising:
 a transparent substrate having first and second opposite faces; and
 a multilayer stack disposed on the second face of the substrate comprising a first layer having first and second opposite faces and a first refractive index and a second layer having first and second opposite faces and a second refractive index, wherein the first face of the first layer is disposed on the second face of the substrate and the first face of the second layer is disposed on the second face of the first layer such that the first layer is interposed between the second layer and the substrate and wherein the substrate has a third refractive index and wherein the first refractive index is less than the second refractive index and the third refractive index;
 a light source carried by the first face of the substrate and arranged to emit light towards the first face of the first layer; and
 a circuit carried by the substrate which is in communication with the light source wherein the circuit includes:
 a monolithic integrated circuit.

15. A device for optically exciting fluorescence, the device comprising:
 a transparent substrate having first and second opposite faces; and
 a multilayer stack disposed on the second face of the substrate comprising a first layer having first and second opposite faces and a first refractive index and a second layer having first and second opposite faces and a second refractive index, wherein the first face of the first layer is disposed on the second face of the substrate and the first face of the second layer is disposed on the second face of the first layer such that the first layer is interposed between the second layer and the substrate and wherein the substrate has a third refractive index and wherein the first refractive index is less than the second refractive index and the third refractive index;
 a light source carried by the first face of the substrate and arranged to emit light towards the first face of the first layer; and
 a detector directed at the second face of the second layer, the multilayer stack interposed between the substrate and the detector;
 wherein the detector comprises an annular light-sensitive region which is concentric with an optical axis or a parallel pair of light-sensitive regions having a mid-line which is collinear with an optical plane.

16. The device according to claim 15, which is adapted to be implantable.

17. A method of operating the device according to claim 15, the method comprising:
 causing a sample to be presented to the second face of the second layer; and
 causing the light source to emit light.

* * * * *